United States Patent
Oka

(10) Patent No.: US 11,415,205 B2
(45) Date of Patent: Aug. 16, 2022

(54) INTERNAL-DEFLECTOR TYPE BALL SCREW

(71) Applicant: NSK LTD., Tokyo (JP)

(72) Inventor: Keitaro Oka, Fujisawa (JP)

(73) Assignee: NSK LTD., Tokyo (JP)

( * ) Notice: Subject to any disclaimer, the term of this patent is extended or adjusted under 35 U.S.C. 154(b) by 46 days.

(21) Appl. No.: 17/058,840

(22) PCT Filed: May 31, 2019

(86) PCT No.: PCT/JP2019/021871
§ 371 (c)(1),
(2) Date: Mar. 3, 2021

(87) PCT Pub. No.: WO2019/230976
PCT Pub. Date: Dec. 5, 2019

(65) Prior Publication Data
US 2021/0207693 A1    Jul. 8, 2021

(30) Foreign Application Priority Data

May 31, 2018   (JP) .............................. JP2018-104877

(51) Int. Cl.
*F16H 25/22*   (2006.01)
*F16H 25/24*   (2006.01)

(52) U.S. Cl.
CPC ......... *F16H 25/2223* (2013.01); *F16H 25/24* (2013.01); *F16H 2025/2481* (2013.01)

(58) Field of Classification Search
CPC .. F16H 25/2223; F16H 25/24; F16H 25/2214; F16H 25/2219; F16H 25/2204;

(Continued)

(56) References Cited

U.S. PATENT DOCUMENTS 3,815,435 A * 6/1974 Eschenbacher ..... F16H 25/2223
74/459.5
3,961,541 A * 6/1976 Fund .................... F16H 25/2223
74/424.87

(Continued)

FOREIGN PATENT DOCUMENTS

DE   102013215644 A1 *  2/2015  ......... F16H 25/2223
EP   1 584 542 A1   10/2005

(Continued)

OTHER PUBLICATIONS

International Search Report (PCT/ISA/210) dated Aug. 27, 2019 in the International Searching Authority in International Application No. PCT/JP2019/021871.

(Continued)

*Primary Examiner* — Daniel D Yabut
(74) *Attorney, Agent, or Firm* — Sughrue Mion, PLLC

(57) ABSTRACT

A piece type ball screw in a screw shaft with a spiral external thread groove on an outer peripheral surface, a nut which is fitted onto the screw shaft and has a spiral internal thread groove on an inner peripheral surface, a plurality of balls rotatably arranged in a track path formed between the external thread groove and the internal thread groove, and a piece member which is attached to the nut and connects the internal thread grooves to each other. The piece member includes a piece body in which a return groove connecting the internal thread grooves is formed and a pair of engaging portions which are provided on the piece body, extend in opposite directions in a circumferential direction of the nut, and engage with the internal thread groove of the nut. A joint portion between the piece body and the engaging portion has a fillet shape.

5 Claims, 22 Drawing Sheets

(58) Field of Classification Search
CPC ............ F16H 25/22; F16H 2025/2481; F16H 2025/2271
See application file for complete search history.

(56) References Cited

U.S. PATENT DOCUMENTS

| | | | |
|---|---|---|---|
| 5,622,082 A | | 4/1997 | Machelski |
| 5,937,700 A | * | 8/1999 | Brown ................ F16H 25/2223 74/424.86 |
| 6,454,042 B1 | * | 9/2002 | Yoshida ............... B62D 5/0448 180/444 |
| 2016/0273633 A1 | | 9/2016 | Heck et al. |

FOREIGN PATENT DOCUMENTS

| | | |
|---|---|---|
| JP | 2005-299719 A | 10/2005 |
| JP | 4727247 B2 | 7/2011 |
| JP | 2015-137743 A | 7/2015 |
| WO | 2015/129845 A1 | 9/2015 |

OTHER PUBLICATIONS

Written Opinion (PCT/ISA/237) dated Aug. 27, 2019 in the International Searching Authority in International Application No. PCT/JP2019/021871.

Communication dated Jun. 15, 2021, from the European Patent Office in European Application No. 19811757.4.

Office Action dated Apr. 5, 2022, issued by the Japan Patent Office in counterpart Japanese Patent Application No. 2018-104877.

* cited by examiner

- Prior Art -

- Prior Art -

- Prior Art -

INTERNAL-DEFLECTOR TYPE BALL SCREW

TECHNICAL FIELD

The present invention relates to a piece type ball screw.

BACKGROUND ART

An internal circulation type ball screw having a screw shaft, a nut and a rolling element and including a piece member which circulates a plurality of the rolling elements interposed between the screw shat and the nut is known (see, for example, Patent Literature 1).

A ball screw illustrated in FIG. 21 is an example of the internal circulation type and is configured to include a ball screw shaft 1 having a spiral groove 1a, a nut 2 having a thread groove 2a, a plurality of balls 3, and a piece member 4. The piece member 4 is fitted into an opening for fitting the piece member provided in the nut 2 from an inner diameter side of the nut.

When the ball screw is used at high speed rotation, a repeated impact force is applied to the piece member 4 by the ball 3, which is a rolling element that circulates inside the ball screw. The impact force often acts in a direction of trying to remove the piece member 4 from nut 2 in a radial outer side. Therefore, in order to use the ball screw at high speed rotation, it is important that the piece member 4 does not come off from the nut 2.

In the piece type ball screw of Patent Literature 1 illustrated in FIG. 21, the piece member 4 is provided with engaging portions 9 and 9 extending in a circumferential direction, as illustrated in FIGS. 22A and 22B, with the aim of accurately positioning the piece member 4 with respect to the thread groove 2a of the nut 2.

The piece member 4 has a connecting groove 8 which connects adjacent one rounds of the thread groove 2a of the nut 2. The thread grooves 2a of the nut 2 are connected by the connecting groove 8 to form a continuous circuit path of one round. The connecting groove 8 is formed in an S shape as illustrated in FIG. 22A.

This piece member 4 has a pair of arm-shaped engaging portions 9 and 9 which engage with the thread groove 2a of the nut 2 of FIG. 22B and axially position the piece member 4 with respect to a nut body 2b. Those engaging portions 9 and 9 are formed in a substantially columnar shape and are provided on an inner diameter side of the piece member 4 so as to extend in an arc shape along the thread groove 2a of the nut 2 in opposite directions to a circumferential direction of the nut 2. The engaging portions 9 and 9 are formed with a curvature along the arc of the thread groove 2a of the nut 2 and function as a retaining member of the piece member 4.

CITATION LIST

Patent Literature

[Patent Literature 1]: Japanese Patent No. 4727247

SUMMARY OF INVENTION

Technical Problem

However, in the ball screw incorporating the piece member 4 having the engaging portions 9 and 9, the repeated impact force of the ball 3, which is a rolling element, is applied to the engaging portions 9 and 9 and the engaging portions 9 and 9 may be broken due to fatigue. Therefore, in order to further increase the permissible rotation speed of the piece type ball screw, it is required to take measures against breakage of the engaging portions 9 and 9.

An object of the invention is to provide a piece type ball screw which avoids stress concentration due to an impact force repeatedly applied to an engaging portion and improves the strength of the engaging portion, thereby further improving the permissible rotation speed.

Solution to Problem

The invention has the following configuration.

A piece type ball screw which includes a screw shat with a spiral external thread groove on an outer peripheral surface, a nut which is fitted onto the screw shaft and has a spiral internal thread groove on an inner peripheral surface, a plurality of rolling elements rotatably arranged in a track path formed between the external thread groove and the internal thread groove, and a piece member which is attached to the nut and connects the internal thread grooves to each other, where the piece member includes a piece body in which a return groove connecting the internal thread grooves is formed and a pair of engaging portions which are provided on the piece body, extend in opposite directions in a circumferential direction of the nut, and engage with the internal thread groove of the nut, and a joint portion between the piece body and the engaging portion has a fillet shape.

Advantageous Effects of the Invention

The piece type ball screw of the invention avoids stress concentration due to the impact force repeatedly applied to the engaging, portion and improves the strength of the engaging portion, whereby the permissible rotation speed can be further improved.

BRIEF DESCRIPTION OF DRAWINGS

FIG. 5A is a perspective view seen from the outside in the nut radial direction and FIG. 5B is a perspective view seen from an inside in the nut radial direction.

FIG. 6A is a perspective view of an inner peripheral surface of the nut before the piece member is attached and FIG. 6B is a perspective view of the inner peripheral surface of the nut after the piece member is attached.

FIG. 19A is a plan view seen from the outside in the nut radial direction and FIG. 19B is a side view of FIG. 19A.

FIG. 22A is a plan view seen from the inside in the nut radial direction of the piece member and FIG. 22B is a partial cross-sectional view along an axial direction of a nut provided with the piece member.

DESCRIPTION OF EMBODIMENTS

Hereinafter, embodiments of the invention will be described in detail with reference to the drawings.

Figure 1:
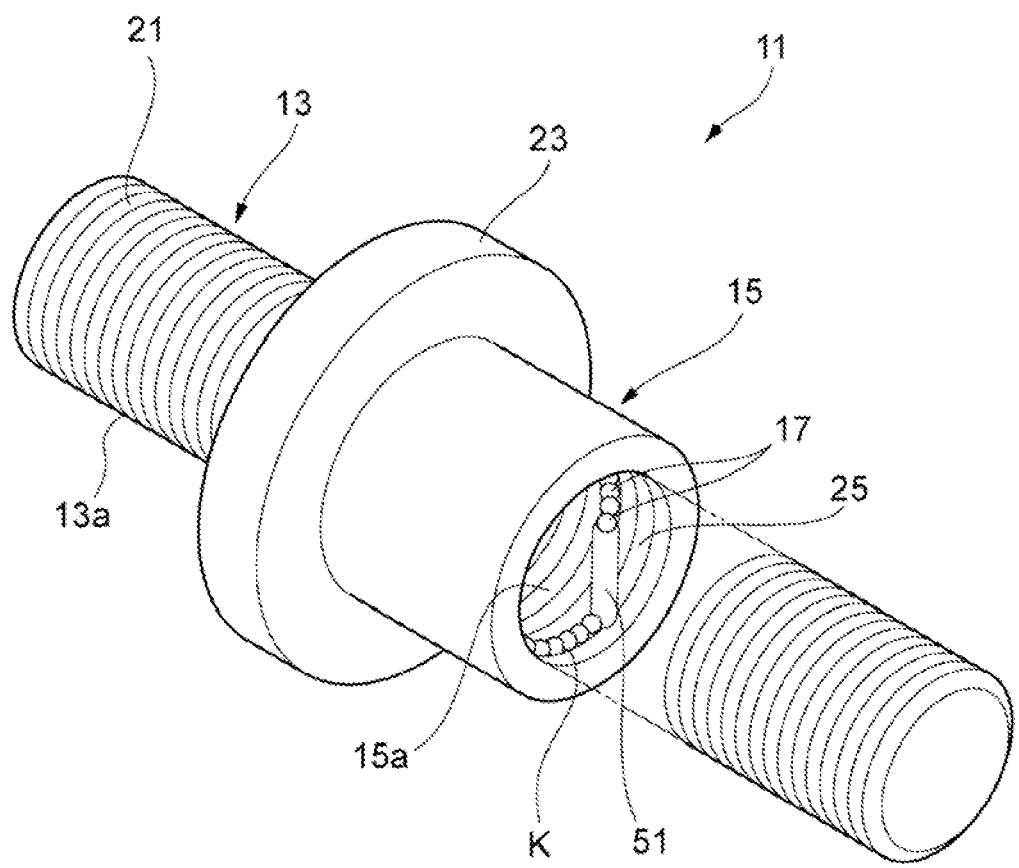
FIG. 1 is a perspective view illustrating a configuration of a piece type ball screw according to an embodiment.
Figure 2:
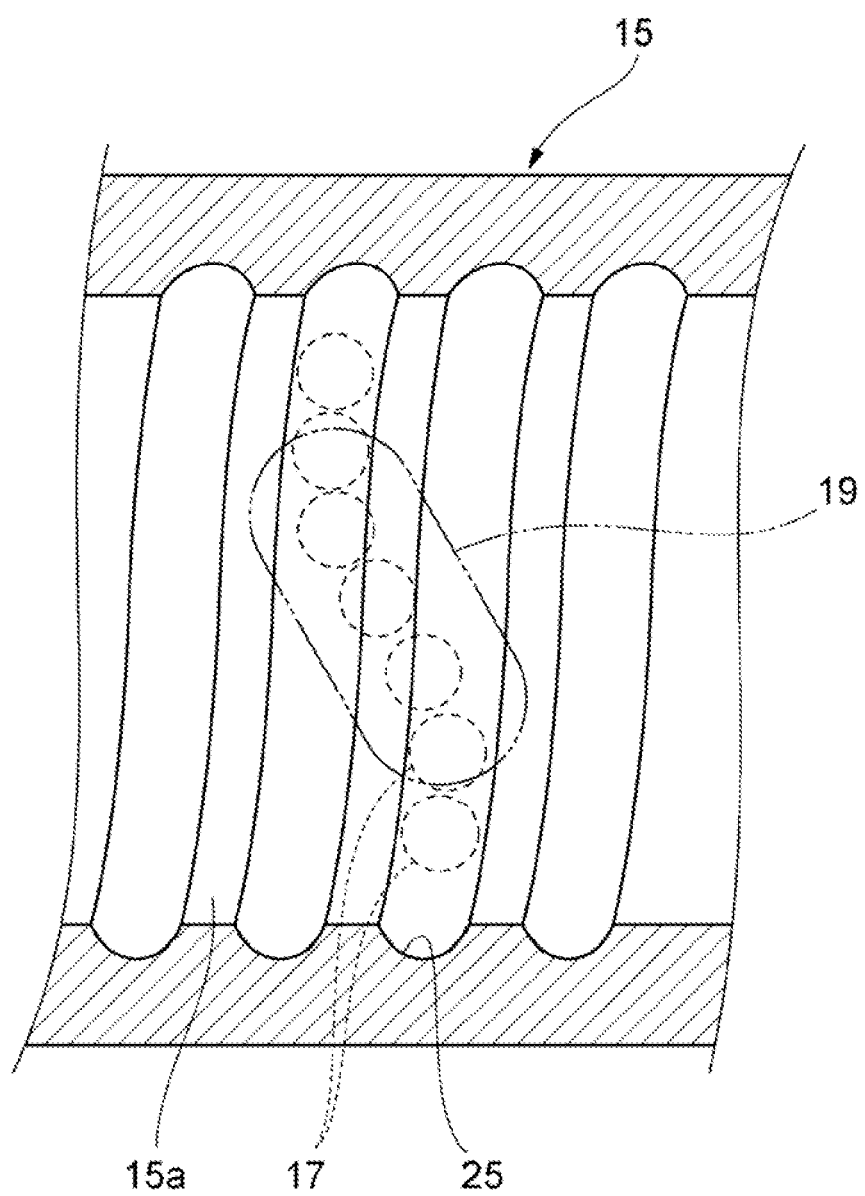
FIG. 2 is a cross-sectional view taken along an axial direction of a nut forming the piece type ball screw.
Figure 3:
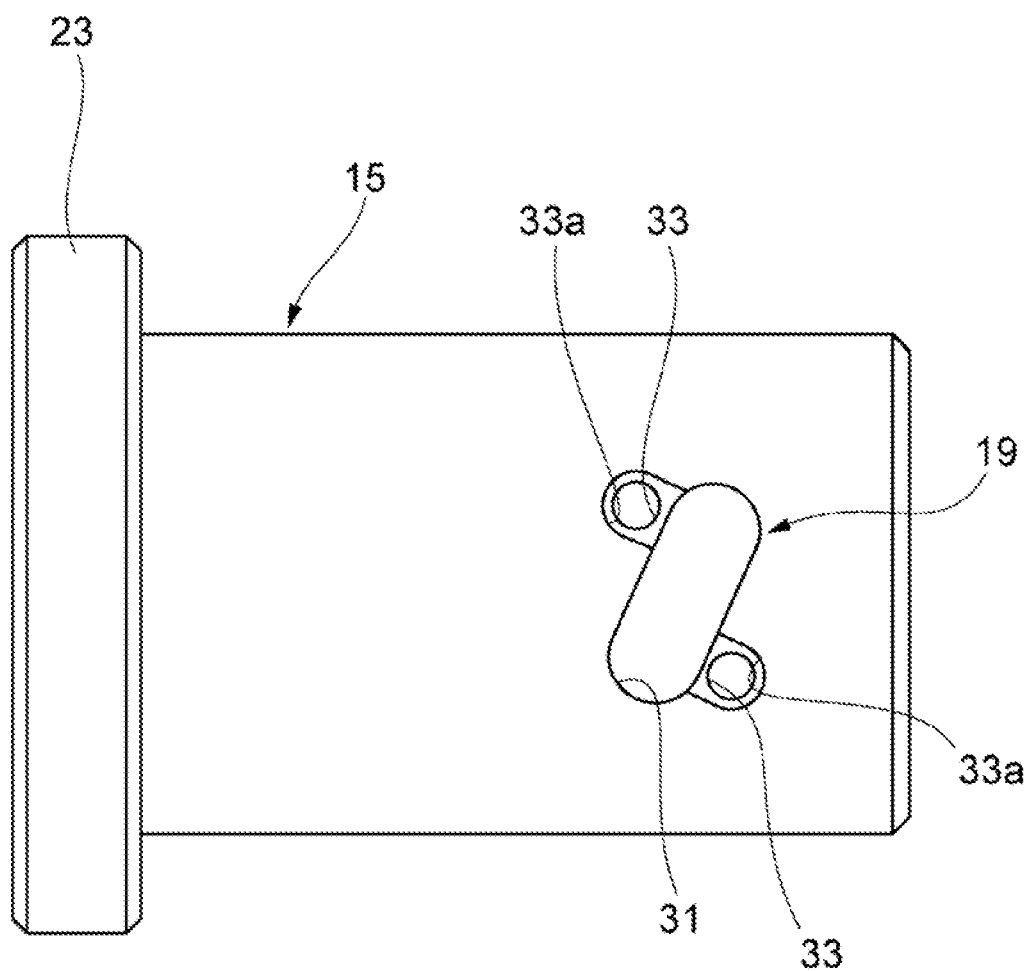
FIG. 3 is a side view of the nut forming the piece type ball screw.

FIG. 1 is a perspective view illustrating a configuration of a piece type ball screw according to the embodiment. FIG. 2 is a cross-sectional view taken along an axial direction of a nut forming the piece type ball screw. FIG. 3 is a side view of the nut forming the piece type ball screw.

As illustrated in FIG. 1, a piece type ball screw 11 according to the embodiment includes a screw shaft 13, a nut 15, a ball 17, and a piece member 19 (see FIGS. 2 and 3).

An external thread groove 21 having a spiral shape and a predetermined lead is formed on an outer peripheral surface 13a of the screw shaft 13. The nut 15 has a substantially cylindrical shape, where an inner diameter is larger than an outer diameter of the screw shaft 13 and the nut 15 is fitted onto the screw shaft 13 with a predetermined gap.

The nut 15 has a flange 23 at one end thereof. The flange 23 is for joining a guide object to which the nut 15 is fixed. An internal thread groove 25 is formed in an inner peripheral surface 15a of the nut 15. The internal thread groove 25 has a lead equal to a lead of the external thread groove 21 of the screw shaft 13. In the piece type ball screw 11, a track path K having a substantially circular cross section is formed by the external thread groove 21 of the screw shaft 13 and the internal thread groove 25 of the nut 15 facing each other. The ball 17 is, for example, a spherical rolling element formed of a steel material and is arranged so as to be rollable in the track path K.

As illustrated in FIGS. 2 and 3, the piece member 19 is attached to the nut 15. The piece member 19 is a member which returns and circulates the ball 17 by a return groove 51 (see FIG. 1) whose details will be described below. A plurality (for example, three) of the piece members 19 are mounted on the nuts 15 at equal intervals in a circumferential direction. One piece member 19 is provided for one winding of a row of balls 17 filled and arranged in the piece type ball screw 11. The number of turns of the row of balls 17 is determined from a load applied to the piece type ball screw 11. Therefore, the number of the piece members 19 is appropriately determined according to the load applied to the piece type ball screw 11 and the like. In addition, in FIG. 3, only one piece member 19 is illustrated.

A piece insertion hole 31 for mounting the piece member 19 is formed in the nut 15. The piece insertion hole 31 is an elongated hole penetrating from an inner circumference of the nut 15 toward an outer circumference. The piece insertion hole 31 is inclined in its longitudinal direction by a predetermined angle with respect to a line orthogonal to a center line of the nut 15. This predetermined angle is set to an angle at which the ball 17 rolling in the external thread groove 21 does not suddenly change direction by the return groove (also referred to as a ball return groove) 51 described below, which is formed in the piece member 19.

In the nut 15, two insertion holes 33 are formed in the vicinity of the piece insertion hole 31. Those insertion holes 33 are holes through which bolts 59 (see FIG. 7), which will be described below, for fixing the piece member 19 to the nut 15 are inserted. Those insertion holes 33 are formed at positions diagonal to the piece insertion hole 31. The insertion hole 33 is a counterbore hole having a recess portion 33a on an outer peripheral side of the nut 15.

First Configuration Example of Piece Member

Figure 4:
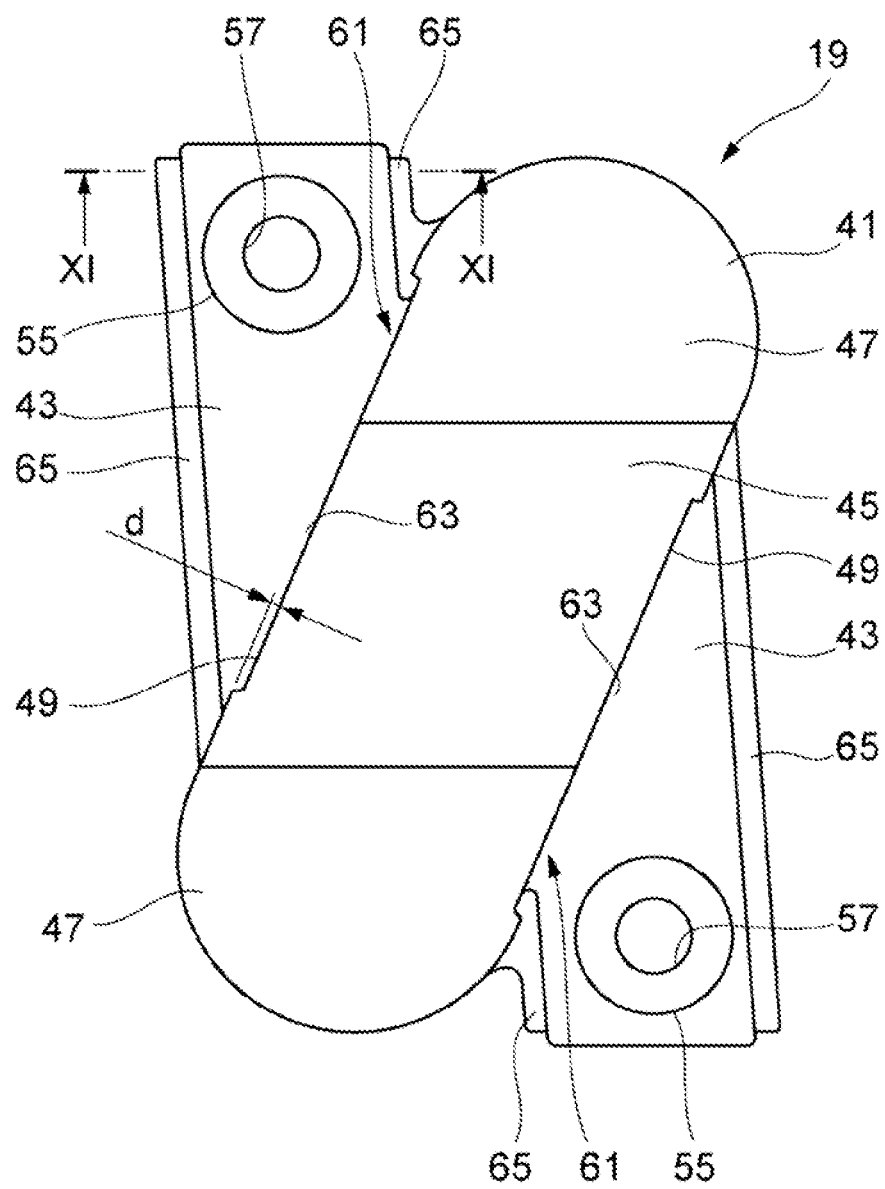
FIG. 4 is a plan view of a piece member of a first configuration example as viewed from an outside in a nut radial direction.
Figure 5B:
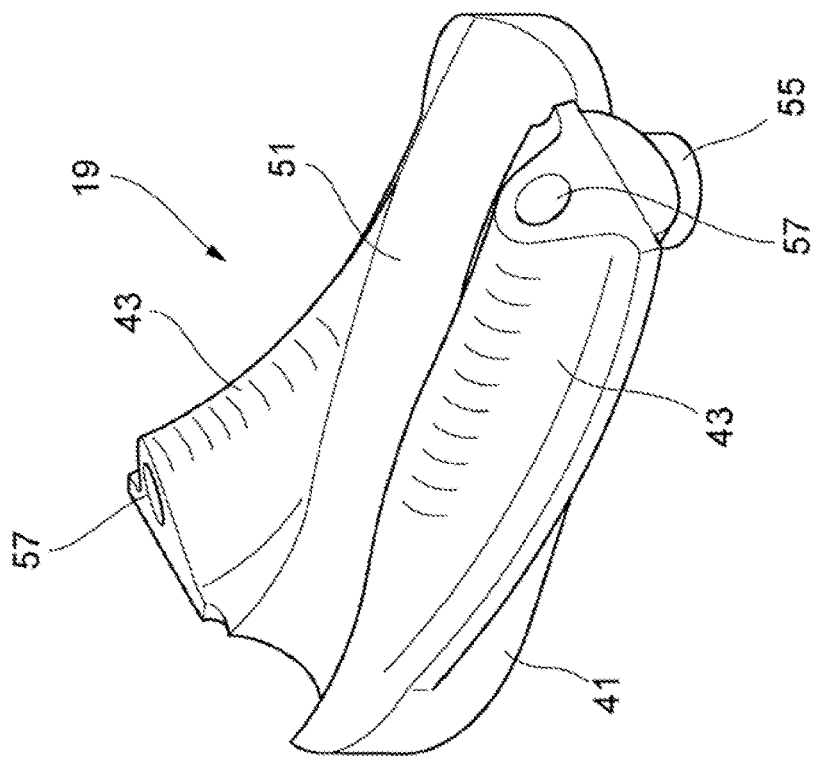
FIGS. 5A and 5B are views illustrating the piece member, where
Figure 5A:
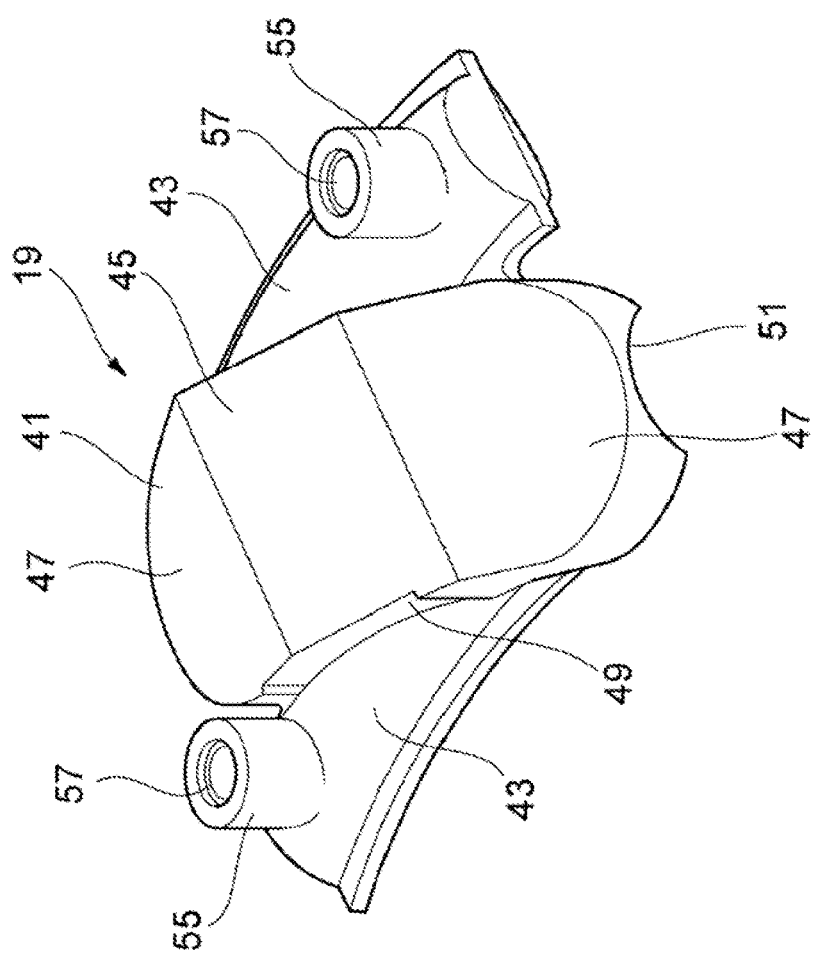

FIG. 4 is a plan view of a piece member of a first configuration example as viewed from an outside in a nut radial direction. FIGS. 5A and 5B are views illustrating the piece member, where FIG. 5A is a perspective view seen from the outside in the nut radial direction and FIG. 5B is a perspective view seen from an inside in the nut radial direction.

As illustrated in FIGS. 4 and 5A, the piece member 19 has a piece body 41 and a pair of engaging portions 43. The engaging portions 43 are formed on both side portions of the piece body 41. Those engaging portions 43 are projected so as to face each other with respect to the piece body 41. The piece member 19 is formed of, for example, a steel material, a sintered alloy, a soft metal, a resin, a ceramic, or the like.

The piece body 41 has an outer shape which matches the piece insertion hole 31 of the nut 15 and is fitted into the piece insertion hole 3 from an inner diameter side of the nut 15. The piece body 41 has a top surface 45 and a pair of inclined surfaces 47 on a front side in a fitting direction to the piece insertion hole 31. The inclined surfaces 47 are formed on both ends of the piece body 41 in a longitudinal direction on the top surface 45 and are inclined rearward in the fitting direction from the top surface 45 to the piece insertion hole 31 of the nut 15. Further, the piece body 41 has relief portions 49 formed in a concave shape along the longitudinal direction on both side portions thereof. The relief portion 49 is formed in a concave shape which is recessed in a direction away from the nut 15.

As illustrated in FIG. 5B, the return groove 51 connecting the internal thread grooves 25 of the nut 15 illustrated in FIG. 1 is formed in the piece body 41. This return groove 51 connects one end of the track path K of the piece type ball screw 11 and the other end of the track path K one turn before. The return groove 51 is formed in a substantially S shape in the longitudinal direction of the piece body 41 and is opened toward an inner peripheral side of the nut 15. The substantially S-shape of the return groove 51 is a shape determined from a function for returning the ball 17. That is, the return groove 51 needs to change the course of the ball 17 so as to return the ball 17 which rolls the track path K to the track path K one turn before and to match the ball 17 with the track path K. Therefore, when the plane shape is a cam curve, for example, a cam curve corresponding to a deformed sine curve is combined to form a substantially S shape so as to suppress a sudden fluctuation of acceleration with respect to the lift.

The engaging portions 43 extend from both sides of the piece body 41. The engaging portions 43 extend in opposite directions to each other in a circumferential direction of die nut 15 and can be engaged with the internal thread groove 25 of the nut 15. That is, when the piece body 41 is fitted into the piece insertion hole 31 of the nut 15, the engaging portion 43 engages the internal thread groove 25 of the nut 15 and protrudes along the external thread groove 21 of the screw shaft 13.

Each of the engaging portions 43 has a boss portion 55 projecting in a mounting direction to the nut 15. The boss portion 55 has a screw hole 57 at its center. The boss portion 55 of the engaging portion 43 is fitted into the insertion hole 33 (see FIG. 3) from an inner peripheral side of the nut 15. Further, the bolt 59 (see FIG. 7) is screwed into the screw hole 57 of the boss portion 55 fitted in the insertion hole 33 from the outer peripheral side of the nut 15 which is the recess portion 33a side of the insertion hole 33. As a result, the engaging portion 43 having the boss portion 55 is fastened and fixed to the nut 15.

Figure 6A:
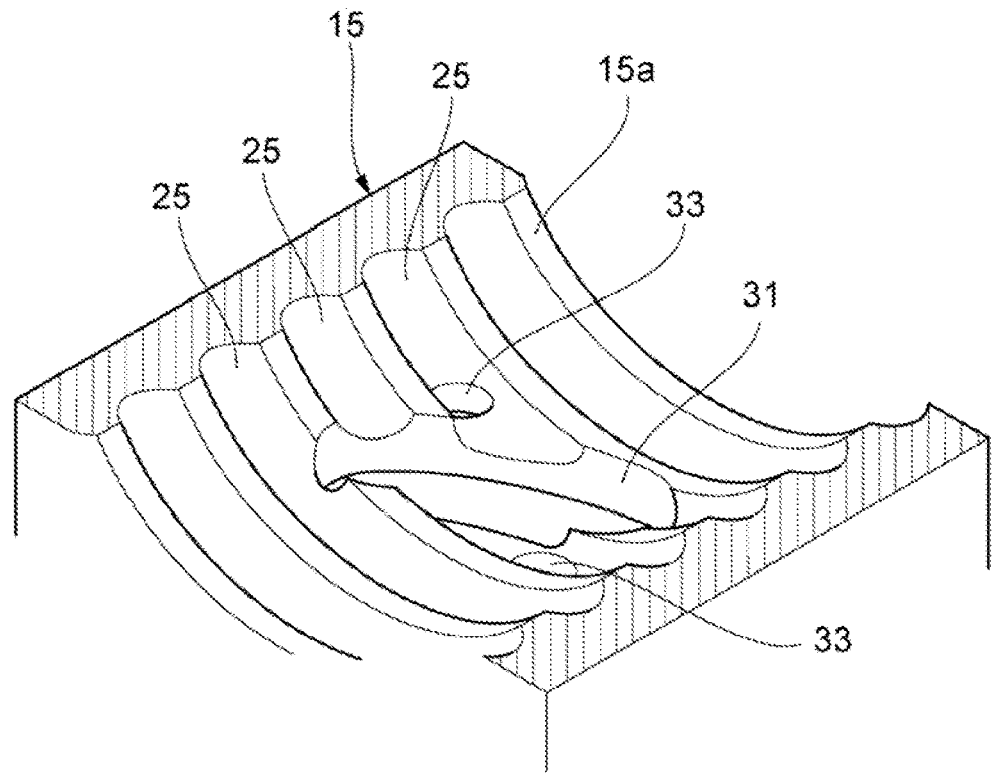
FIGS. 6A and 6B are views illustrating how to attach the piece member to the nut, where
Figure 6B:
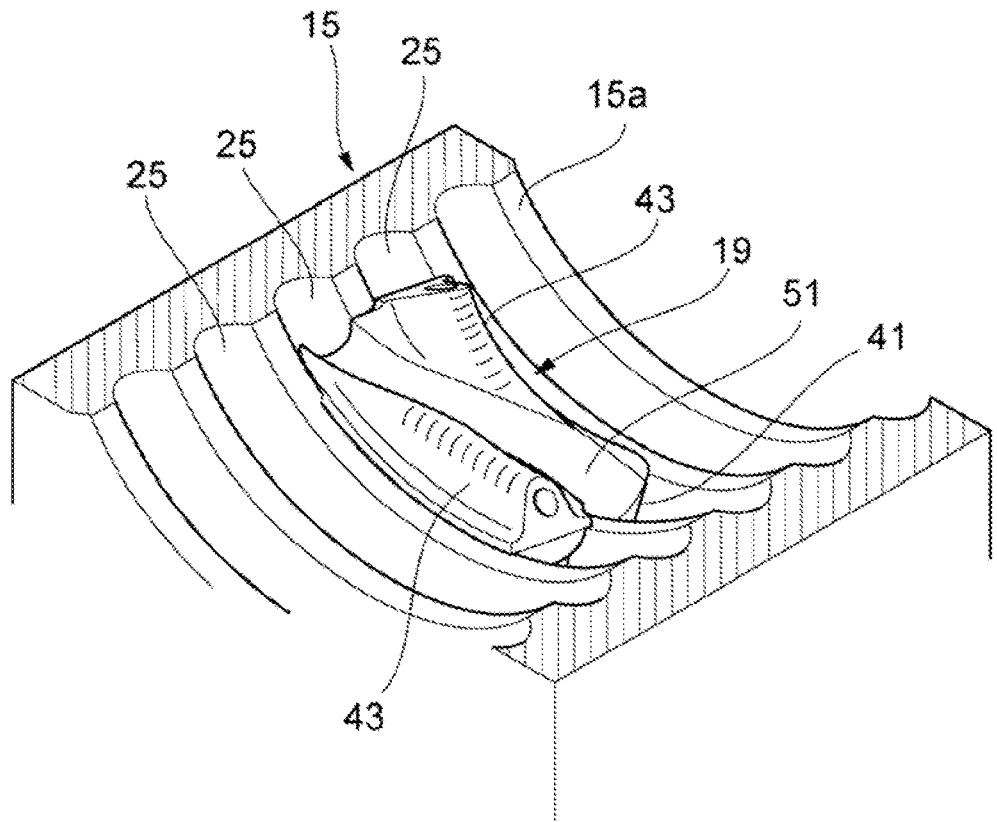
Figure 7:
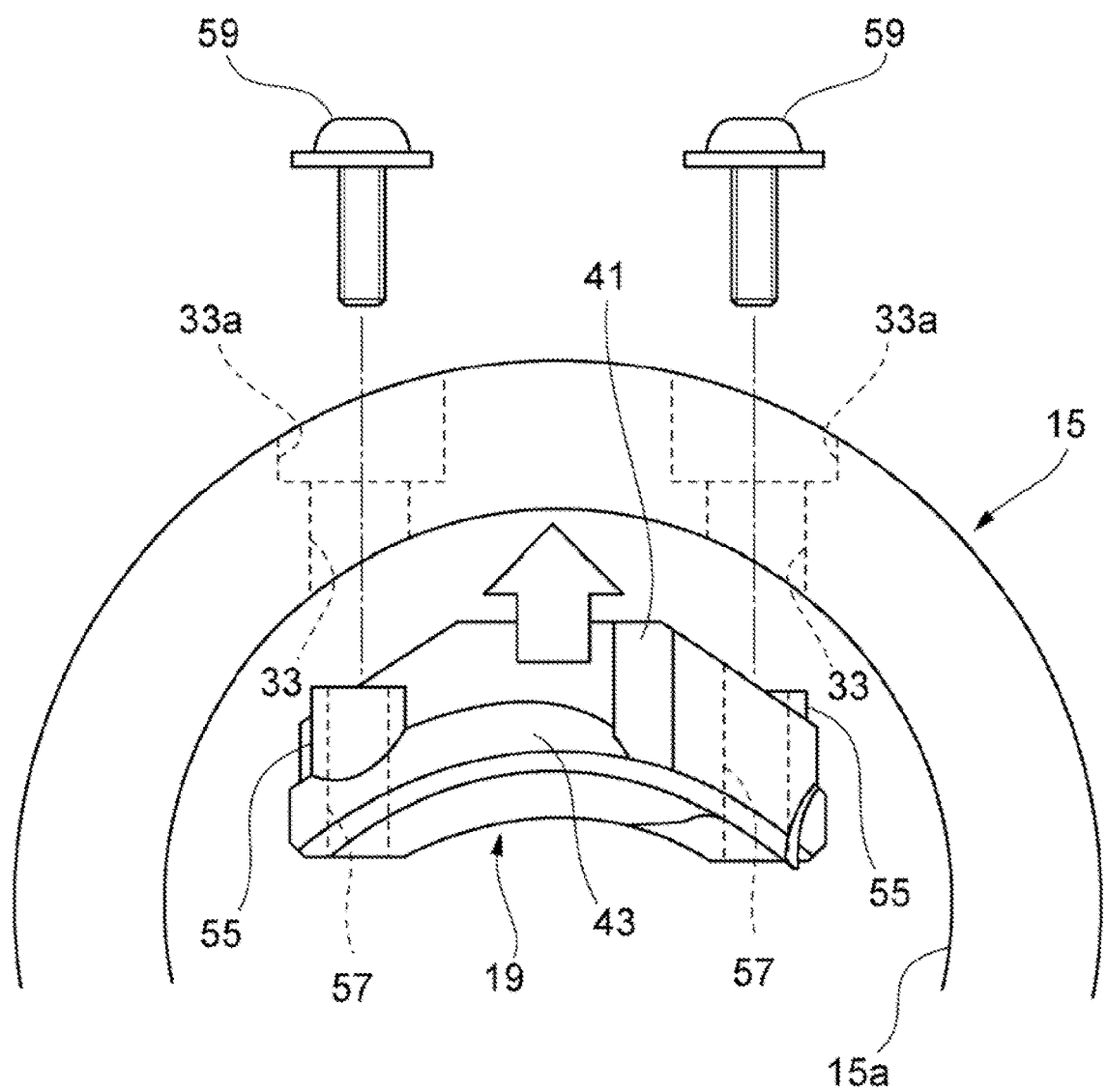
FIG. 7 is a front view illustrating how to attach the piece member to the nut as viewed from a nut axial direction.

FIGS. 6A and 6B are views illustrating how to attach the piece member to the nut, where FIG. 6A is a perspective view of the inner peripheral surface of the nut before the piece member is attached and FIG. 6B is a perspective view of the inner peripheral surface of the nut after the piece member is attached. FIG. 7 is a front view illustrating how to attach the piece member to the nut as viewed from the nut axis direction.

As illustrated in FIG. 6B, the piece body 41 of the piece member 19 is fitted into the piece insertion hole 31 formed in the nut 15 from the inner peripheral side of the nut 15, as illustrated in FIG. 6A. In this way, each engaging portion 43 is fitted into the internal thread groove 25 and the boss portion 55 (see FIG. 5A) of the engaging portion 43 is fitted into the insertion hole 33. In this state, as illustrated in FIG. 7, the piece member 19 is fixed to the nut 15 by screwing the bolt 59 into the screw hole 57 of the boss portion 55 fitted in the insertion hole 33 from the outer peripheral side of the nut 15 and fastening the bolt 59.

Figure 8:
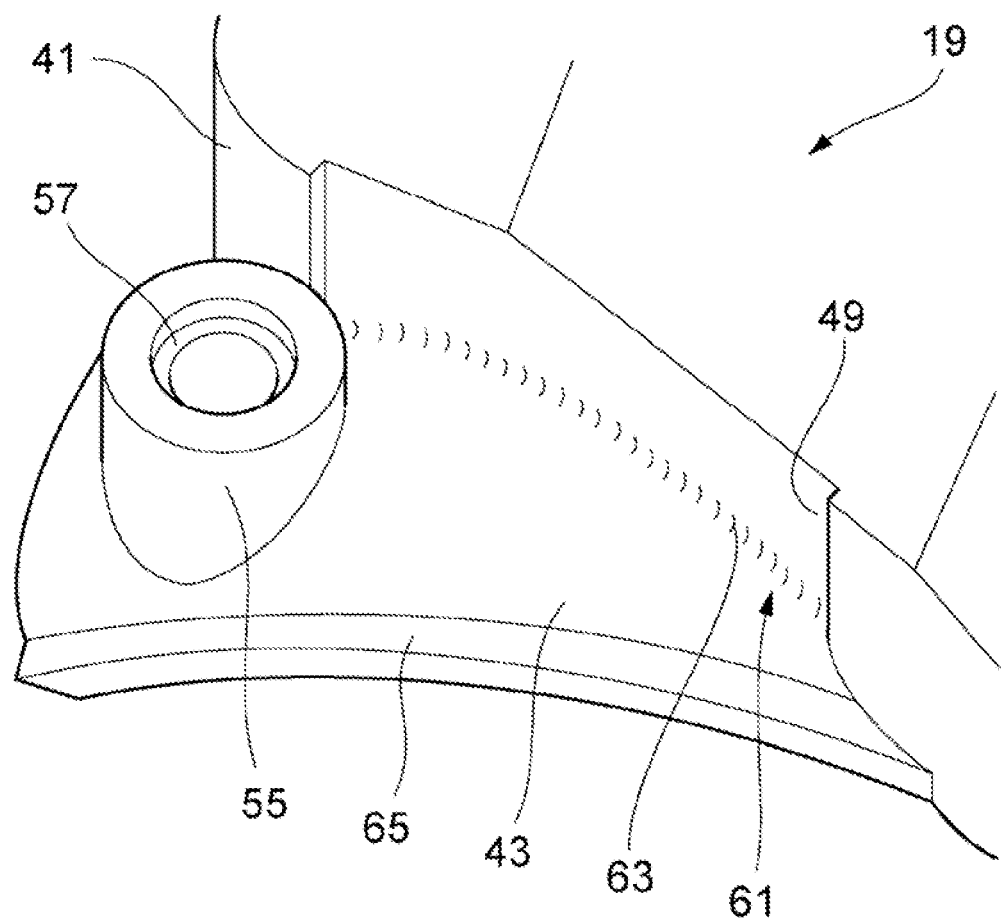
FIG. 8 is a perspective view of a part of the piece member for explaining a piece body and an engaging portion of the piece member.
Figure 9:
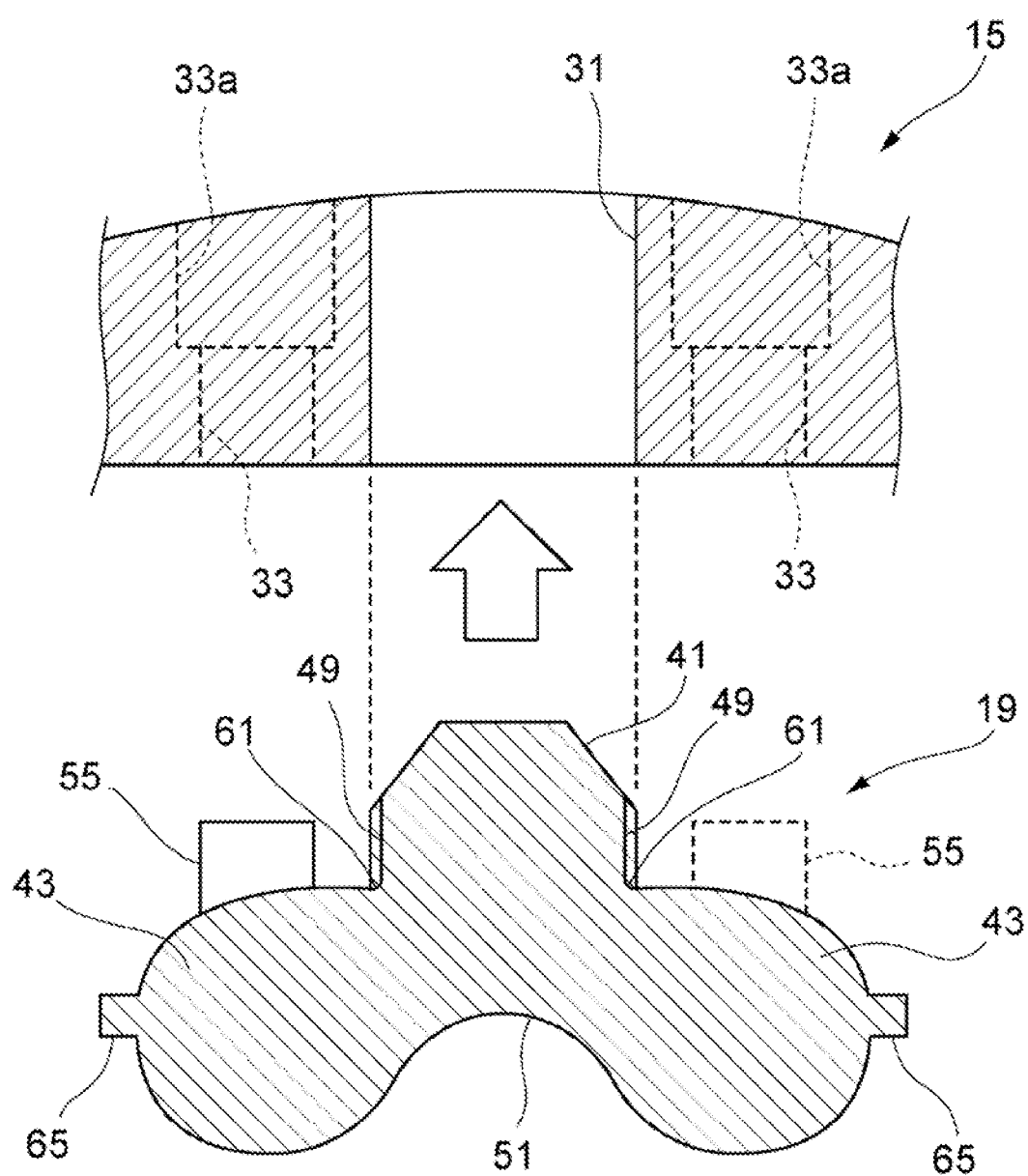
FIG. 9 is a cross-sectional view of the nut and the piece member before fitting to explain a fitting state of the piece body into a piece insertion hole of the nut.
Figure 10:
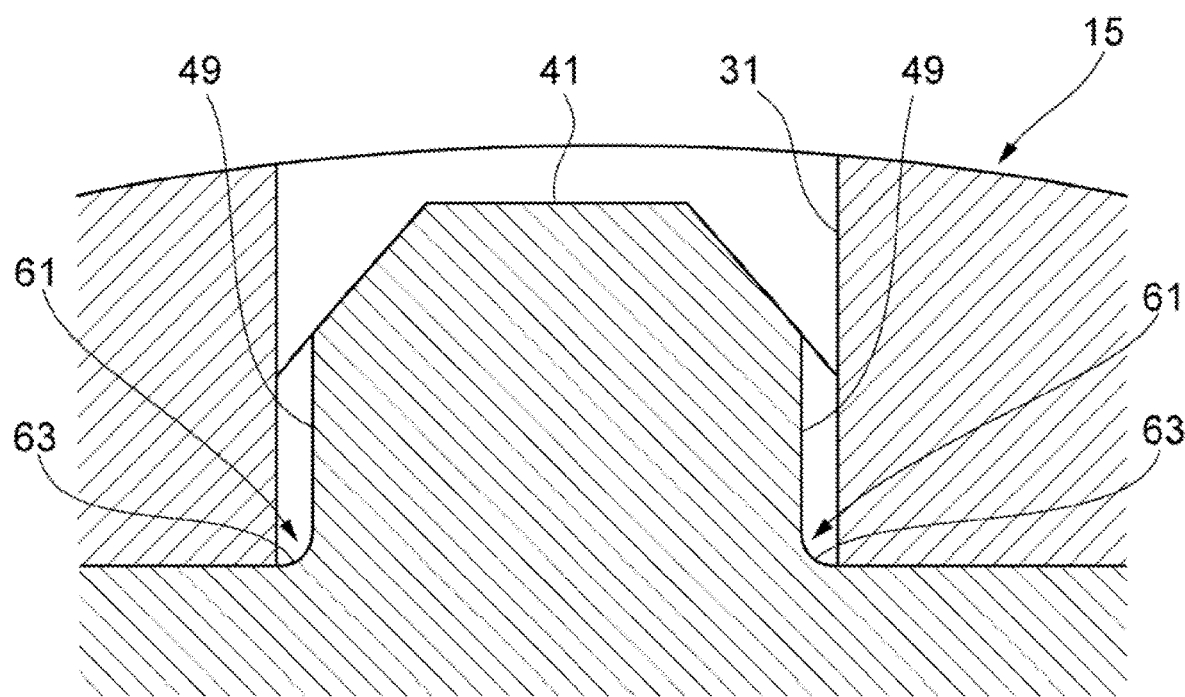
FIG. 10 is a cross-sectional view of a part of the nut and the piece member for explaining the fitting state of the piece body into the piece insertion hole of the nut.
Figure 11:
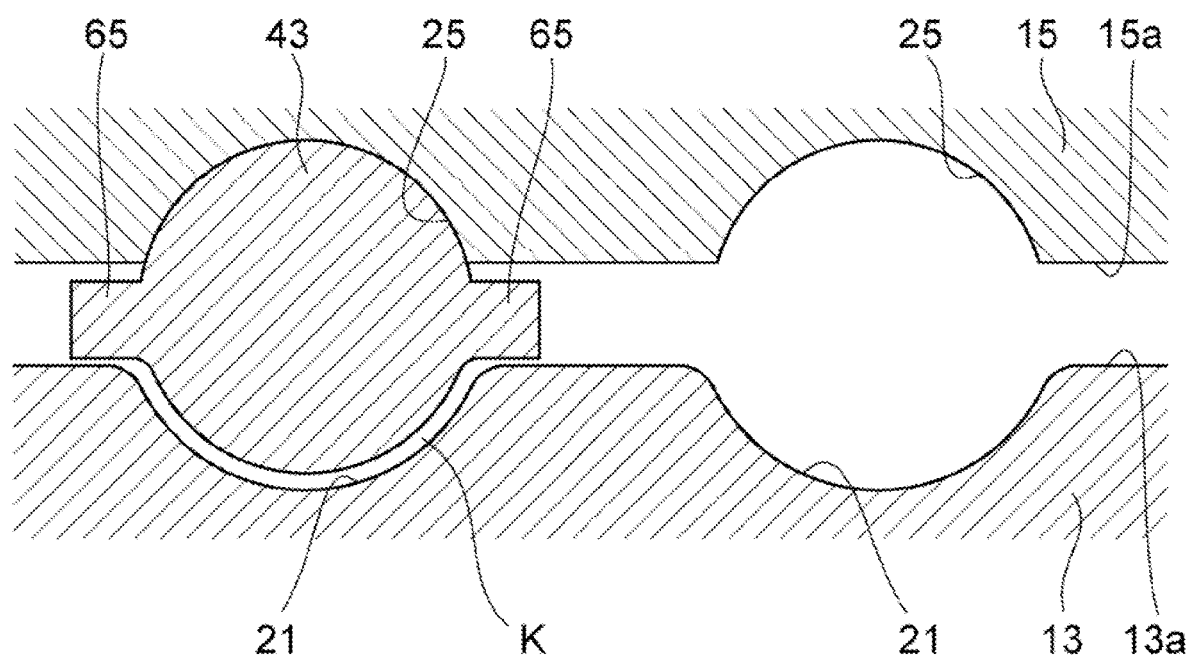
FIG. 11 is a cross-sectional view taken along the line XI-XI in FIG. 4 of the engaging portion of the piece member arranged in a track path.

FIG. 8 is a perspective view of a part of the piece member for explaining the piece body and the engaging portion of the piece member. FIG. 9 is a cross-sectional view of the nut and the piece member before fitting to explain a fitting state of the piece body into the piece insertion hole of the nut. FIG. 10 is a cross-sectional view of a part of the nut and the piece member for explaining the fitting state of the piece body into the piece insertion hole of the nut. FIG. 11 is a cross-sectional view taken along the XI-XI in FIG. 4 of the engaging portion of the piece member arranged in the track path.

As illustrated in FIGS. 4 and 8, in the engaging portion 43, a joint portion 61 with the piece body 41 is formed in a fillet shape. Specifically, the joint portion 61 has a fillet-shaped portion 63 formed by chamfering in an arc shape having a radius of 0.2 mm or more, preferably 0.3 mm or more.

The piece body 41 has the relief portion 49 recessed in a direction away from the nut 15 and the fillet-shaped portion 63 is formed in the relief portion 49. Here, the relief portion 49 has a depth dimension d (mm) equal to or greater than a radius $r_f$ (mm) of the arc of the fillet-shaped portion 63 ($d > r_f$). Preferably, the depth dimension d of the relief portion 49 is a size obtained by adding 0.1 mm or more to the radius $r_f$ of the arc of the fillet-shaped portion 63 ($d \geq r_f + 0.1$).

As described above, the fillet-shaped portion 63 of the engaging portion 43 is provided in the relief portion 49. Therefore, as illustrated in FIG. 9, even when the piece body 41 is fitted into the piece insertion hole 31 as if the piece member 19 is attached to the nut 15, as illustrated in FIG. 10, the fillet-shaped portion 63 does not interfere with a corner portion of the piece insertion hole 31 of the nut 15.

Further, as illustrated in FIGS. 4, 5A, 5B, and 8, the respective engaging portions 43 are formed with a pair of protruding portions (first protruding portions) 65 protruding in a direction orthogonal to a circumferential direction of the nut 15. The protruding portion 65 is formed in a continuous flange shape along a longitudinal direction of the engaging portion 43 and faces the inner peripheral surface 15a (groove shoulder portion) between the internal thread grooves 25 of the nut 15. Since the protruding portion 65 protrudes in the direction orthogonal to the circumferential direction of the nut 15, as illustrated in FIG. 11, in a state where the screw shaft 13 is screwed into the nut 15, it is arranged in a space between the outer peripheral surface 13a of the screw shaft 13 and the inner peripheral surface 15a of the nut 15.

Figure 12:
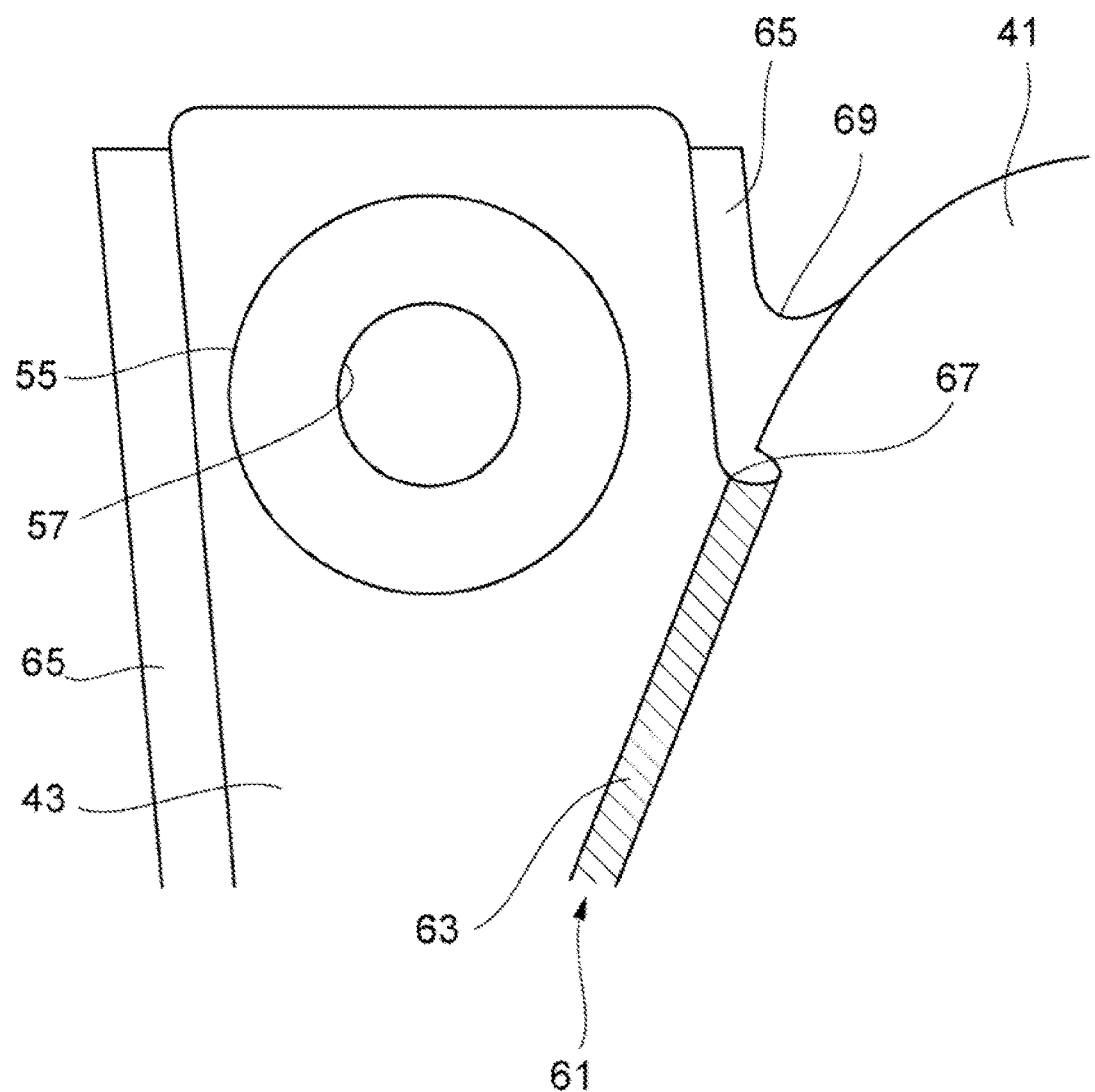
FIG. 12 is a plan view of a V-shaped joint portion between the piece body and the engaging portion.

FIG. 12 is a plan view of the V-shaped joint portion between the piece body and the engaging portion.

As illustrated in FIG. 12, the piece member 19 has a V-shaped joint portion 67 in which the engaging portion 43 and the piece body 41 are joined by crossing their respective longitudinal directions in a radial plan view of the nut 15. In the V-shaped joint portion 67, a rounded R-shaped notch 69 is provided in the protruding portion 65 protruding in the direction orthogonal to the circumferential direction of the nut 15. It is desirable that the notch 69 is formed in an R shape having a radius of 0.5 mm or more.

Then, in the piece type ball screw 11 in which the piece member 19 is attached to the nut 15, by the return groove 51 provided in the piece body 41 illustrated in FIG. 1 of the piece member 19, the ball 17 rolling in the track path K toward the piece member 19 is guided to get over the screw thread, and return it to the track path K one turn before (one lead before). As a result, the ball 17 can be circulated. That is, a substantially circular infinite circulation path is formed on the outside of the screw shaft 13 by the passage formed by the return groove 51 and the track path K. Therefore, as the screw shaft 13 rotates relative to the nut 15, the ball 17 rolls between the external thread groove 21 and the internal thread groove 25, thereby the nut 15 is allowed to linearly move in the axial direction of the nut 15 with respect to the screw shaft 13.

As described above, according to the piece type ball screw 11 according to the embodiment, since the joint portion 61 between the piece body 41 of the piece member 19 and the engaging portion 43 has a fillet shape, the durability of the joint portion 61 can be significantly improved and the stress concentration can be relaxed. As a result, even when the repeated impact force of the ball 17 is applied to the engaging portion 43, breakage due to fatigue at the joint portion 61 of the engaging portion 43 with the piece body 41 can be suppressed. Therefore, the permissible rotation speed of the piece type ball screw 11 can be further increased, and thus the performance can be improved. The improvement of impact resistance by relaxing the stress concentration is more effective when the piece member 19 is formed of a material whose strength and toughness are lower than those of steel materials such as soft metals, resins, and ceramics, or when the kinetic energy is increased by providing the ball 17 having a large size (for example, 7 mm or more in diameter).

Further, since the fillet-shaped portion 63 is formed in the relief portion 49 recessed in the direction away from the nut 15, the interference of the fillet-shaped portion 63 with the nut 15 can be suppressed when the piece member 19 is attached to the nut 15. As a result, the piece member 19 can be attached to the nut 15 with high accuracy.

Moreover, by forming the protruding portion 65 in the engaging portion 43, the cross-sectional area of the engaging portion 43 can be increased to increase the strength of the engaging portion 43.

Also, since the protruding portion 65 is arranged in the space between the outer peripheral surface 13a of the strew shaft 13 and the inner peripheral surface 15a of the nut 15, the protruding portion 65 will be held by the outer peripheral surface 13a of the screw shaft 13 and the inner peripheral surface 15a of the nut 15. As a result, the engaging portion 43 can be stably engaged in the internal thread groove forming the track path K. In addition, the protruding portion 65 can suppress the invasion of foreign matter into the track path K.

Further, the stress concentration in the V-shaped joint portion 67 can be suppressed by the protruding portion 65 formed in the V-shaped joint portion 67 between the engaging portion 43 and the piece body 41. Moreover, since the R-shaped notch 69 is provided in the protruding portion 65 formed in the V-shaped joint portion 67, the stress concentration in the protruding portion 65 can also be suppressed.

Next, various modification examples of the piece type ball screw 11 of the invention will be described. In the following description, the same parts and members as those in FIGS. 1 to 12 are designated by the same reference numerals and letters to omit or simplify the description.

First Modification Example

Figure 13:
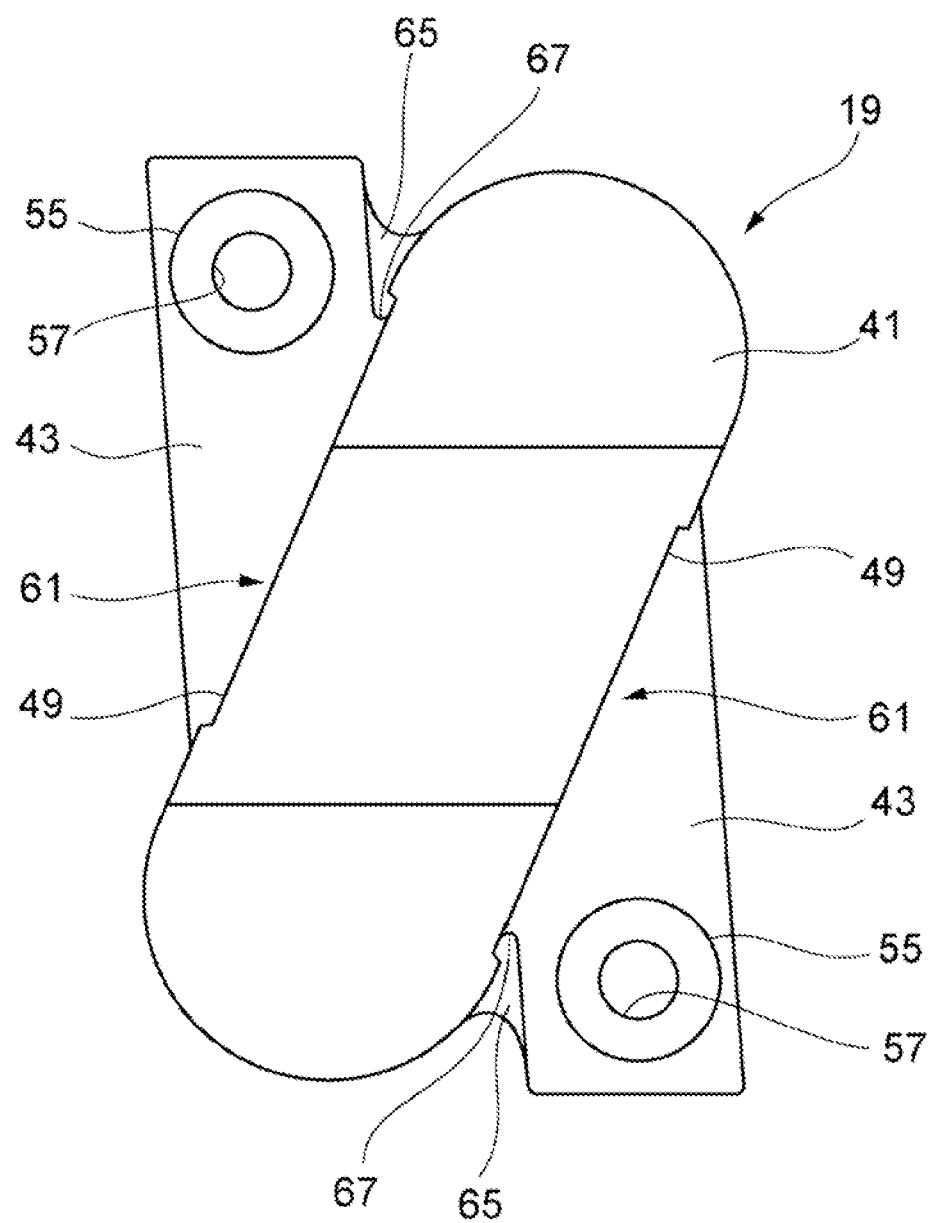
FIG. 13 is a plan view of a piece member according to a first modification example.

FIG. 13 is a plan view of a piece member according to a first modification example.

As illustrated in FIG. 13, in the first modification example, the protruding portion 65 is provided only in the V-shaped joint portion 67. Also in this first modification example, the radial load applied to the piece member 19 can be dispersed by at least the protruding portion 65 provided in the V-shaped joint portion 67. Further, by providing the protruding portion 65 only in the V-shaped joint portion 67, the manufacturing man-hours can be reduced and the processing can be easily performed as compared with the case where the protruding portion 65 is provided in the entire circumference of the engaging portion 43.

Second Modification Example

Figure 14:
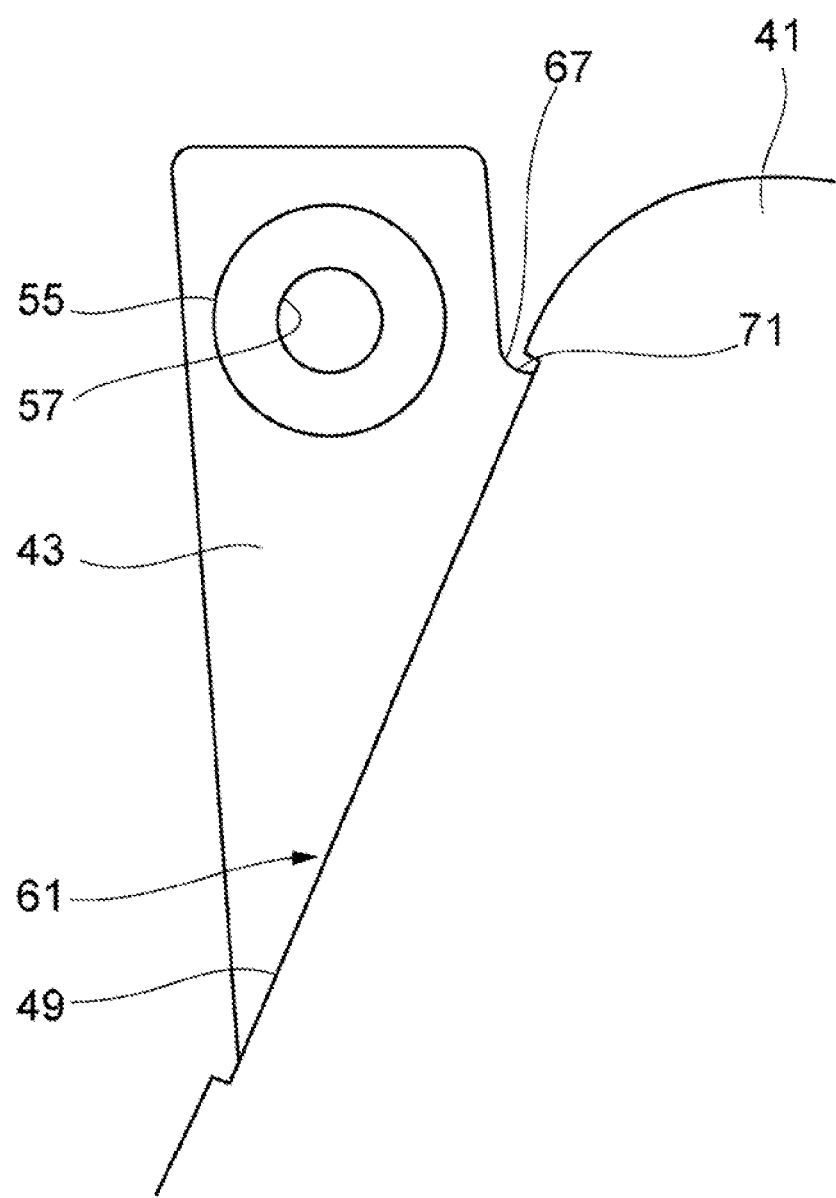
FIG. 14 is a plan view of a part of a piece member according to a second modification example.

FIG. 14 is a plan view of a part of a piece member according to a second modification example.

As illustrated in FIG. 14, in the second modification example, the protruding portion 65 is not provided and an R-shaped arc portion 71 is formed in the V-shaped joint portion 67 in the joint portion 61 of the piece body 41 and the engaging portion 43. According, to this second modification example, stress concentration in the V-shaped joint portion 67 can be avoided.

Third Modification Example

Figure 15:
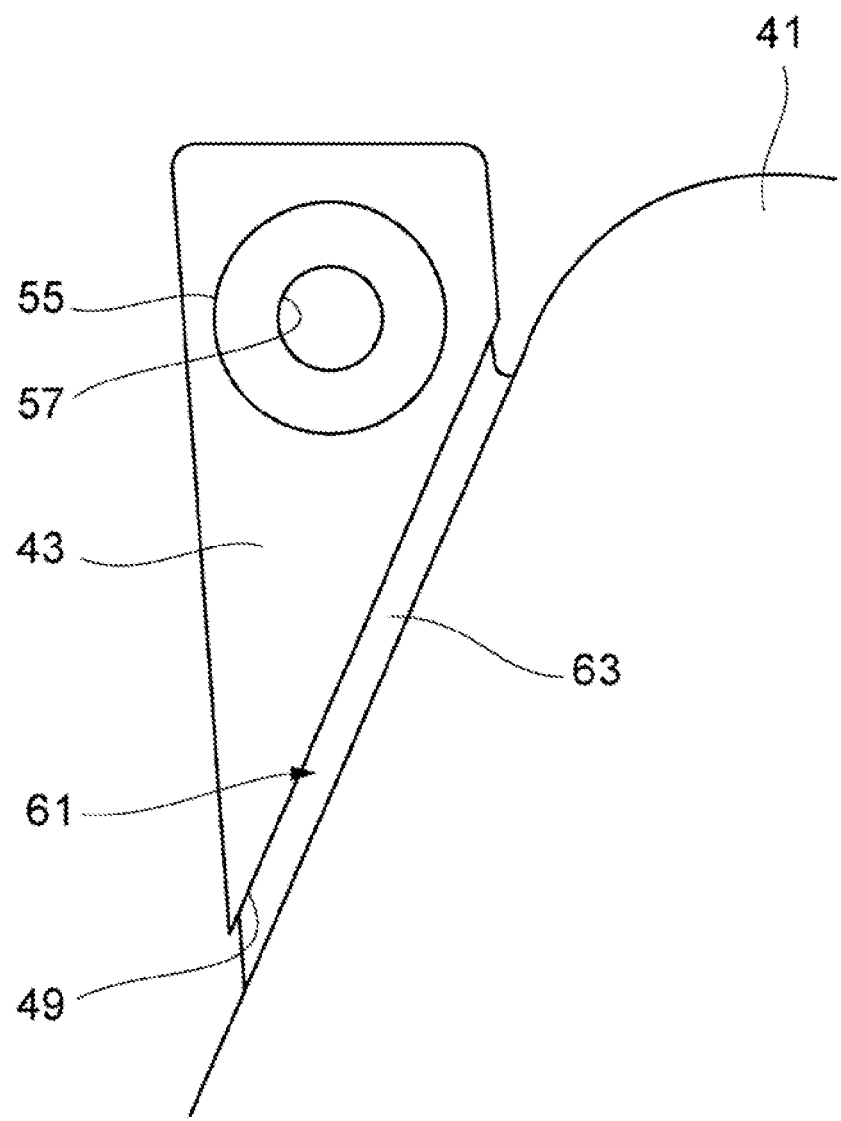
FIG. 15 is a plan view of a part of a piece member according to a third modification example.

FIG. 15 is a plan view of a part of a piece member according to a third modification example.

As illustrated in FIG. 15, in the third modification example, the relief portion 49 is provided on the engaging portion 43 side of the joint portion 61 of the piece body 41 and the engaging portion 43 so as to be recessed from the surface of the engaging portion 43. As a result, interference of the fillet-shaped portion 63 with the corner portion of the piece insertion hole 31 when the piece body 41 is fitted into the piece insertion hole 31 (see FIG. 3) is avoided. According to this third modification example, the strength of the piece body 41 can be increased by providing the relief portion 49 on the engaging portion 43 side.

Figure 16:
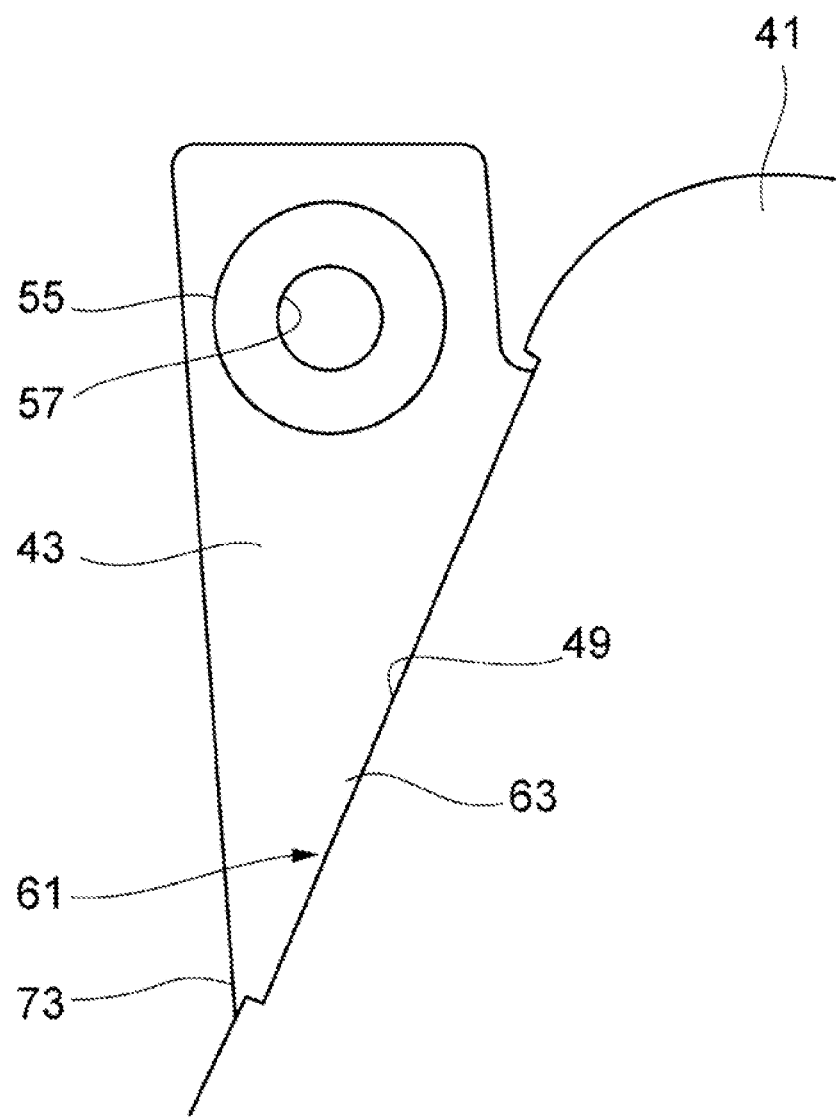
FIG. 16 is a plan view of a part of the piece member for explaining a formation range of a relief portion.

In addition, the relief portion 49 provided in the joint portion 61 may be formed in a range excluding a portion where the fillet-shaped portion 63 is unlikely to interfere with the corner portion of the piece insertion hole 31 when the piece body 41 is fitted into the piece insertion hole 31. For example, as illustrated in FIG. 16, in the radial plane of the nut 15, it may be provided in addition to an obtuse angle joint portion 73 of the joint portion 61 where the engaging portion 43 and the piece body 41 are joined with crossing the longitudinal directions thereof.

Second Configuration Example of Piece Member

Figure 17:
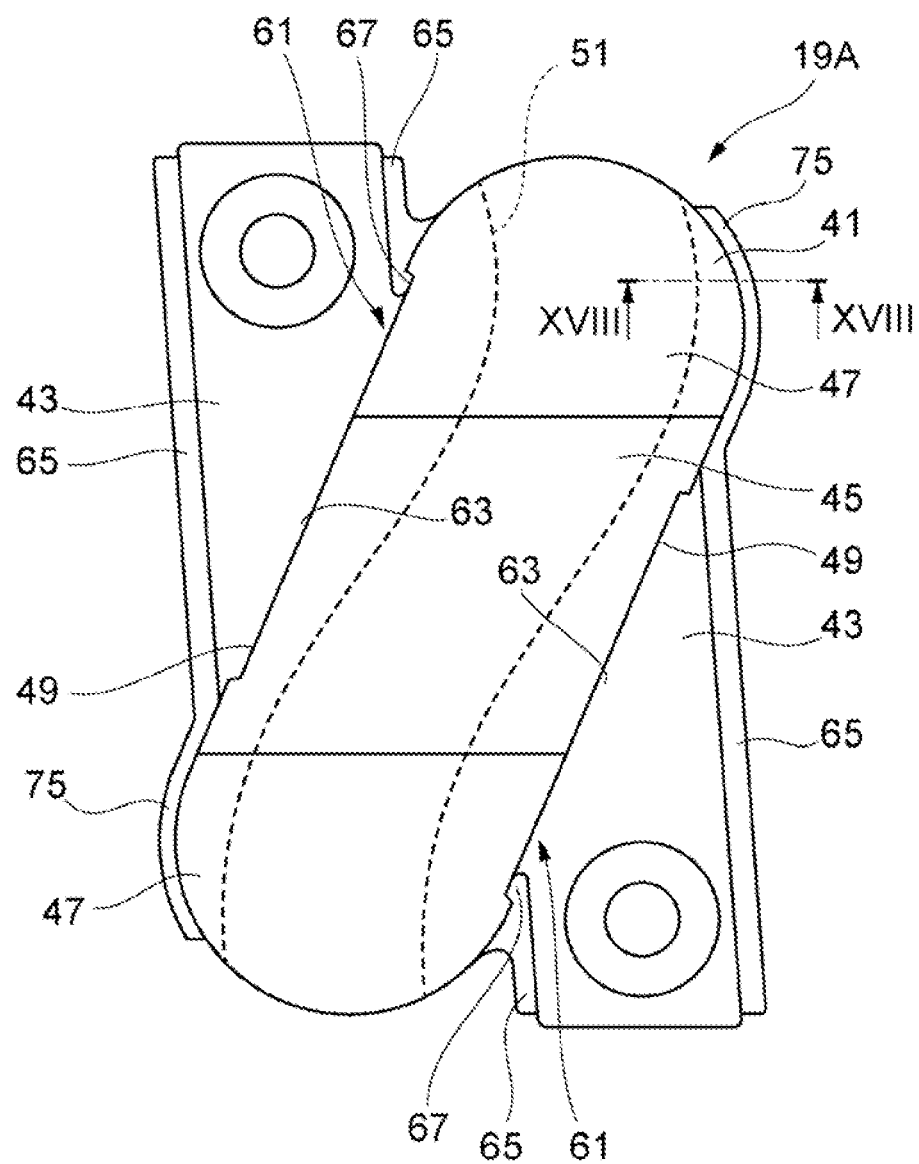
FIG. 17 is a plan view of a piece member of a second configuration example as viewed from the outside in the nut radial direction.

FIG. 17 is a plan view of a piece member 19A of a second configuration example as viewed from the outside in the nut radial direction.

The piece member 19A of the second configuration example forms a protruding portion 75 (second protruding portion) protruding in a direction orthogonal to the circumferential direction of the nut 15 (see FIG. 1) described above on the piece body 41 of the piece member 19 of the first configuration example illustrated in FIG. 4. Other configurations are the same as those of the piece member 19 of the first configuration example.

The protruding portion 75 is connected to the protruding portion 65 formed in the engaging portion 43 and is formed along the piece body 41 in a curved state having substantially the same curvature as the piece body 41. However, the protruding portion 75 is not arranged in an area serving as an entrance/exit port of the ball passage of the return groove 51. In the illustrated example, the area from the V-shaped joint portion 67 formed between the engaging portion 43 and the piece body 41 to the entrance/exit port of the ball passage along the piece body 41 is not provided with the protruding portion 75. However, the protruding portion 75 may also be provided in that area.

Figure 18:
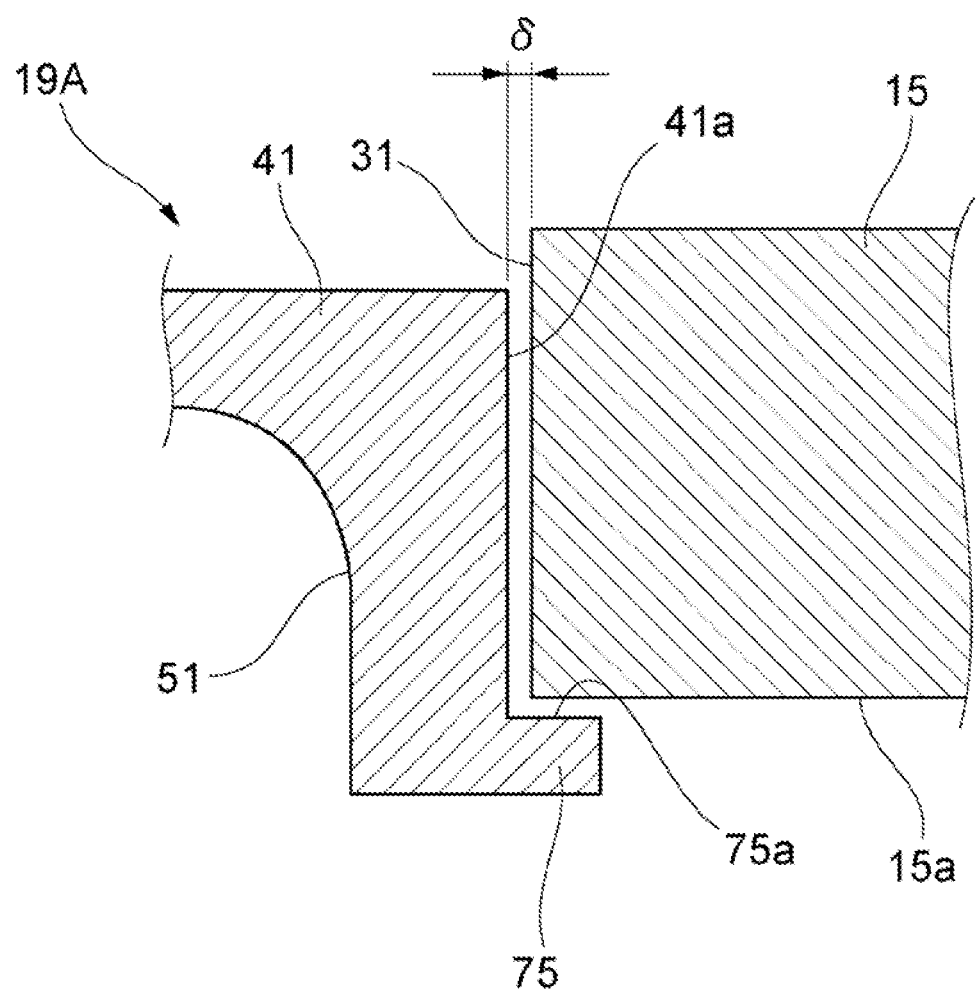
FIG. 18 is a schematic cross-sectional view illustrating a gap with respect to the nut in an XVIII-XVIII cross section of the piece body illustrated in FIG. 17.

FIG. 18 is a schematic cross-sectional view illustrating a gap with respect to the nut 15 in an XVIII-XVIII cross section of the piece body 41 illustrated in FIG. 17.

When the piece member 19A is inserted into an insertion hole 31 of the nut 15 from the inside of the nut, a side surface 41a of the piece body 41 faces an inner wall surface of the insertion hole 31 with a gap δ. In this case, the size of the gap δ is designed to be about 0.1 mm to 0.3 mm so that the return groove 51 of the piece member 19A and the internal thread groove 25 (see FIG. 6B) of the nut 15 can be positioned.

Grease is often sealed inside the nut of the ball screw, but when the ball screw is driven after the nut is filled with the grease, excess grease may leak from the gap δ. Therefore, in this configuration, the protruding portion 75 is provided so as to close the gap δ formed linearly along the insertion direction (diameter direction) of the piece member 19A into the insertion hole 31. The protruding portion 75 has an outer peripheral surface 75*a* (upper surface in FIG. 18) orthogonal to the inner wall surface of the insertion hole 31 and the outer peripheral surface 75*a* faces the inner peripheral surface 15*a* of the nut 15.

That is, by providing the protruding portion 75 in the piece body 41 of the piece member 19A, the gap δ extending linearly in a radial direction illustrated in FIG. 18 bends in an L shape on a nut inner diameter side of the gap δ. It is preferable that the outer peripheral surface 75*a* and the inner peripheral surface 15*a* are in contact with each other, but the gap between the two may be about 0.4 mm at the maximum.

By providing the protruding portion 75 in the piece body 41, the grease inlet to the gap δ with the nut 15 is reduced, and thus it becomes difficult for the grease to be introduced into the gap δ. Therefore, the grease leaked from the gap δ does not adhere to the outer peripheral portion of the nut and the adhered grease does not contaminate the outer peripheral portion of the nut with dust attached thereto. Therefore, the aesthetic appearance of the ball screw is not spoiled and the maintainability of the ball screw is not deteriorated.

Further, the protruding portion 75 can be locked to the inner peripheral surface 15*a* of the nut 15 to prevent the piece member 19A from coming out of the insertion hole 31 of the nut 15. For example, even when the engaging portion 43 (see FIG. 7) is damaged, the piece member 19A does not come out of the nut 15.

Another Configuration Example of Piece Member

Figure 19B:
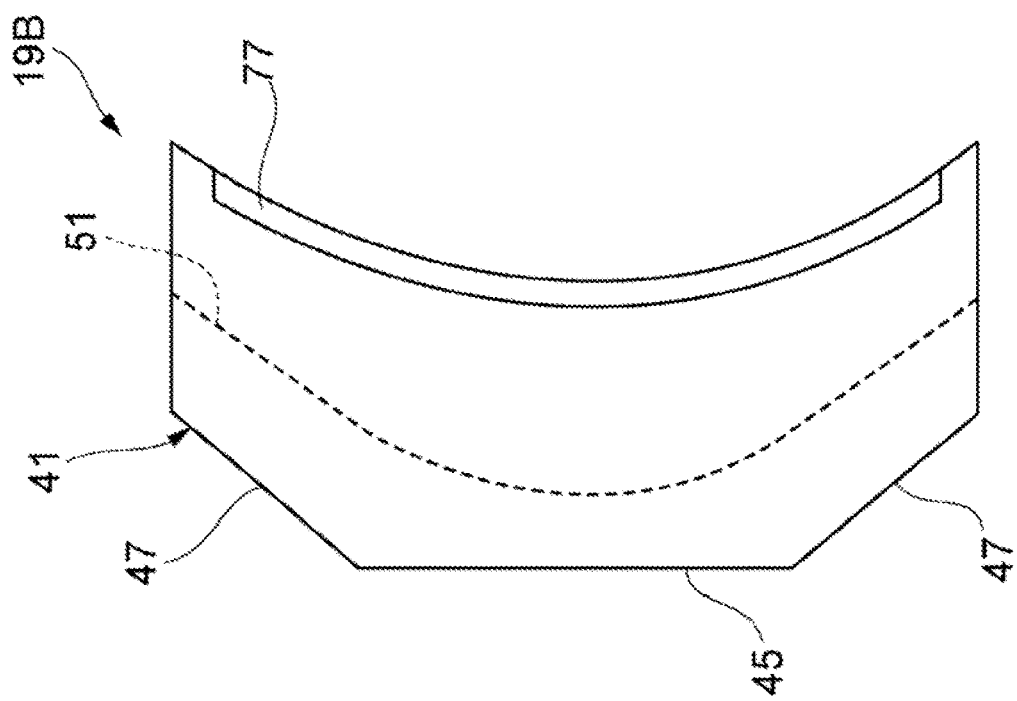
FIGS. 19A and 19B are views illustrating a piece member of another configuration example, where
Figure 19A:
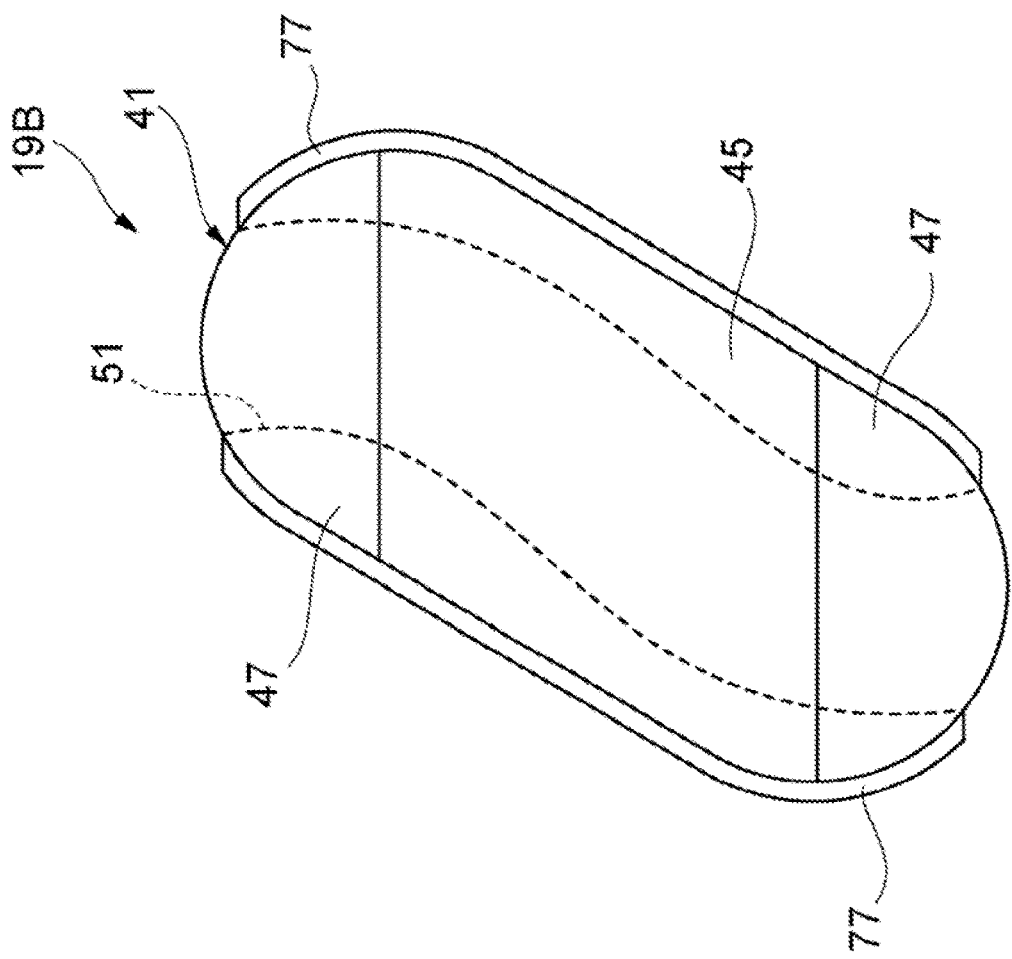
Figure 20:
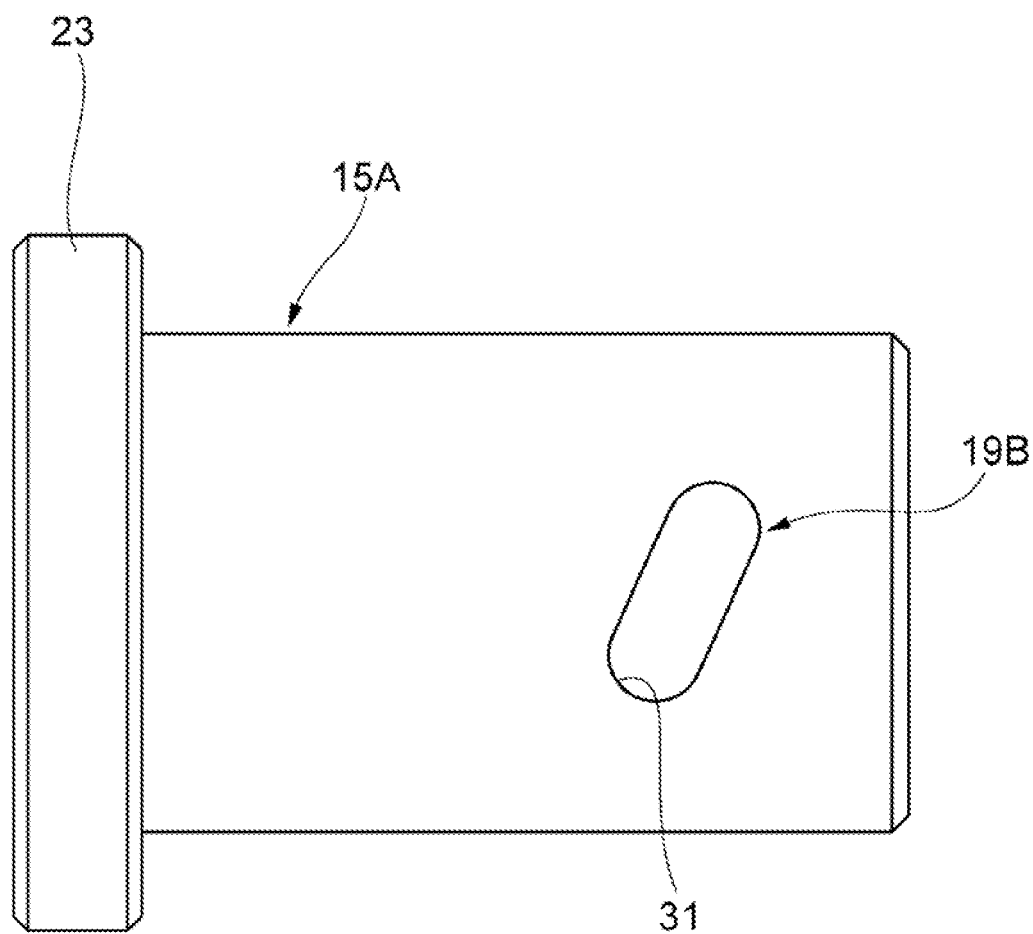
FIG. 20 is a side view of the nut to which the piece member of the other configuration example is attached.
Figure 21:
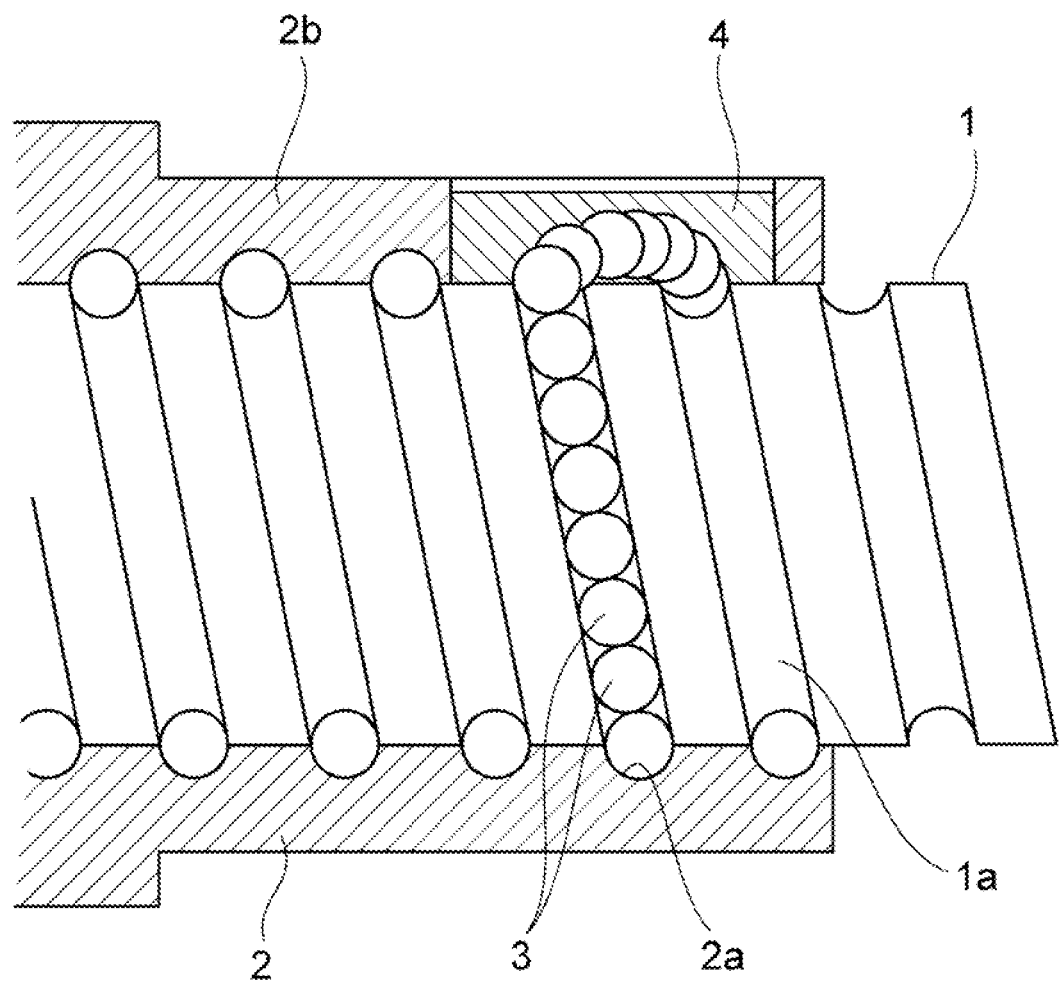
FIG. 21 is a cross-sectional view along an axial direction of a piece type ball screw for explaining a configuration of the piece type ball screw provided with a piece member of the related art.
Figure 22A:
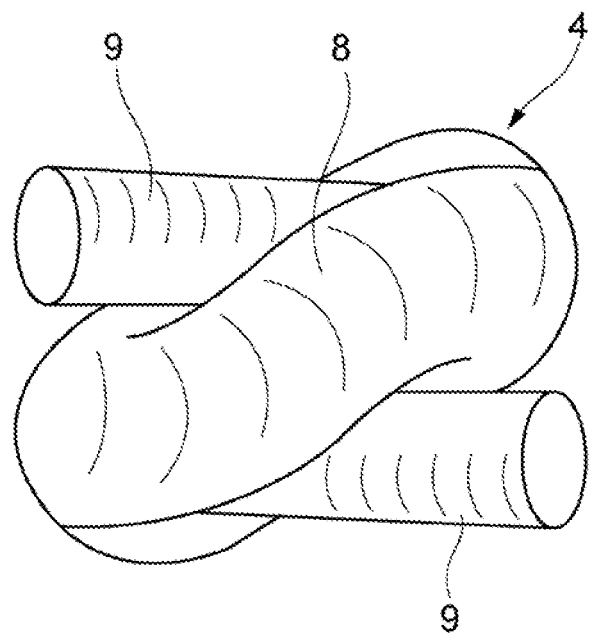
FIGS. 22A and 22B are views illustrating a piece member provided on a piece type ball screw of the related art, where
Figure 22B:
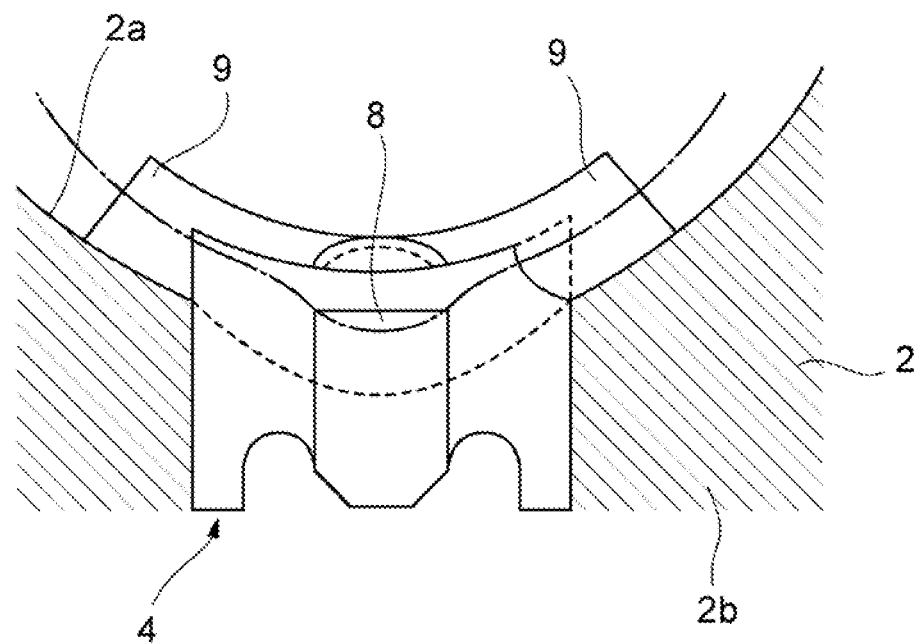

FIGS. 19A and 19B are views illustrating a piece member 19B of another configuration example, where FIG. 19A is a plan view seen from the outside in the nut radial direction and FIG. 19B is a side view of FIG. 19A. FIG. 20 is a side view of the nut to which the piece member 19B is attached.

The piece member 19B is provided with protruding portions (second protruding portions) 77 which protrude in the direction orthogonal to the circumferential direction of the nut instead of the pair of engaging portion 43 of the piece member 19A illustrated in FIG. 17. A pair of protruding portions 77 are formed from a ball inlet to the ball outlet of the return groove 51 on both side surfaces of the piece body 41 in a longitudinal direction. The entirety of the protruding portion 77 is curved with substantially the same curvature and is formed along the side surface of the piece body 41. Further, the protruding portion 77 is not arranged in the region serving as the entrance/exit port of the ball passage of the return groove 51 as in the second configuration example.

The piece member 19B is fitted into the insertion hole 31 formed in a nut 15A illustrated in FIG. 20 and the return groove of the piece member 198 and an internal thread groove of the nut 15A are positioned, and then the piece member 19B is fixed to the nut 15A using an adhesive, a bolt, or the like.

According to the piece member 19B of the configuration, the engaging portion 43 provided in the piece members 19 and 19A of the first and second configuration examples can be removed, and thus the processing process of the piece member 198 can be simplified. Further, when the piece member 1913 is attached to the insertion hole 31 of the nut 15A, since the protruding portion 77 closes a gap between the piece member 19B and the nut 15A, the grease does not leak to the outer peripheral surface of the nut through the gap. Therefore, the aesthetic appearance of the ball screw is not spoiled and the maintainability of the ball screw is not deteriorated. In this configuration, since it is not necessary to provide other additional members such as a sealing member to prevent grease from leaking, the assembling property of the ball screw is not deteriorated.

Further, since the protruding portion 77 is locked to the inner peripheral surface 15*a* of the nut 15A, it is possible to prevent the piece member 19B from coming out of the insertion hole 31 of the nut 15A.

As described above, the invention is not limited to the embodiments described above and it is also the intention of the invention to combine the configurations of the embodiments with each other, to modify and apply them based on the description of the specification and well-known techniques by those skilled in the art, and further those are also included in the scope of seeking protection.

As described above, the following matters are disclosed in this specification.

(1) A piece type ball screw which includes a screw shaft with a spiral external thread groove on an outer peripheral surface, a nut which is fitted onto the screw shalt and has a spiral internal thread groove on an inner peripheral surface, a plurality of rolling elements rotatably arranged in a track path formed between the external thread groove and the internal thread groove, and a piece member which is attached to the nut and connects the internal thread grooves to each other, where the piece member includes a piece body in which a return groove connecting the internal thread grooves is formed and a pair of engaging portions which are provided on the piece body, extend in opposite directions in a circumferential direction of the nut, and engage with the internal thread groove of the nut, and a joint portion between the piece body and the engaging portion has a fillet shape.

According to the piece type ball screw, since the joint portion between the piece body of the piece member and the engaging portion has a fillet shape, the durability of the joint portion can be significantly improved and the stress concentration can be relaxed. As a result, even when the repeated impact force of the rolling element is applied to the engaging portion, breakage due to fatigue at the joint portion of the engaging portion with the piece body can be suppressed. Therefore, the permissible rotation speed of the piece type ball screw can be further increased, and thus the performance can be improved. The improvement of impact resistance by relaxing the stress concentration is more effective when the piece member is formed of a material whose strength and toughness are lower than those of steel materials such as soft metals, resins, and ceramics, or when the kinetic energy is increased by providing the rolling element having a large size (for example, 7 mm or more in diameter).

(2) The piece type ball screw according to (1), where at least one of the piece body and the engaging portion has a relief portion recessed in a direction away from the nut and the fillet-shaped portion is formed in the relief portion.

According to the piece type ball screw, since the fillet-shaped portion is formed in the relief portion recessed in the direction away from the nut, the interference of the fillet-shaped portion with the nut can be suppressed when the piece member is attached to the nut. As a result, the piece member can be attached to the nut with high accuracy.

(3) The piece type ball screw according to (1) or (2), where the engaging portion is formed with a first protruding portion protruding in a direction orthogonal to the circumferential direction of the nut.

According to the piece type ball screw, by forming the first protruding portion in the engaging portion, the cross-sectional area of the engaging portion can be increased to increase the strength of the engaging portion.

(4) The piece type ball screw according to (1) or (3), where a second protruding portion is formed in at least a part of an outer region of an entrance/exit port of a ball passage of the return groove in the piece body so as to protrude in the direction orthogonal to the circumferential direction of the nut.

According to the piece type ball screw, by forming the second protruding portion in the piece body, the cross-sectional area of the piece body can be increased to increase the strength of the piece body.

(5) The piece type ball screw according (3) or (4), where
the protruding portion is arranged in a space between an outer peripheral surface of the screw shaft and an inner peripheral surface of the nut.

According to the piece type ball screw, since the protruding portion is arranged in the space between the outer peripheral surface of the screw shaft and the inner peripheral surface of the nut, the protruding portion will be held by the outer peripheral surface of the screw shaft and the inner peripheral surface of the nut. As a result, the engaging portion or the piece body can be stably engaged in the internal thread groove forming the track path. In addition, the protruding portion can suppress the invasion of foreign matter into the track path.

(6) The piece type ball screw according to any one of (3) to (5), where in the piece member, in a radial plan view of the nut, an R-shaped notch is provided in the protruding portion formed in a V-shaped joint portion in which the engaging portion and the piece body are joined so as to intersect longitudinal directions.

According to the piece type ball screw, the stress concentration in the V-shaped joint portion can be suppressed by the protruding portion formed in the V-shaped joint portion between the engaging portion and the piece body. Moreover, since the R-shaped notch is provided in the protruding portion formed in the V-shaped joint portion, the stress concentration in the protruding portion can also be suppressed.

This application is based on a Japanese patent application filed on Mar. 8, 2018 (Japanese Patent Application No. 2018-42185) and a Japanese patent application filed on May 31, 2018 (Japanese Patent Application No. 2018-104877), the contents of which are incorporated herein by reference.

REFERENCE SIGNS LIST

11: piece type ball screw
13: screw shaft
13a: outer peripheral surface
15: nut
15a: inner peripheral surface
17: ball (rolling element)
19: piece member
21: external thread groove
25: internal thread groove
41: piece body
43: engaging portion
49: relief portion
51: return groove
61: joint portion
63: fillet-shaped portion
65: protruding portion (first protruding portion)
67: V-shaped joint portion
69: notch
75: protruding portion (second protruding portion)
K: track path

The invention claimed is:

1. A piece type ball screw comprising:
a screw shaft with a spiral external thread groove on an outer peripheral surface,
a nut which is fitted onto the screw shaft and has a spiral internal thread groove on an inner peripheral surface,
a plurality of rolling elements rotatably arranged in a track path formed between the external thread groove and the internal thread groove; and
a piece member which is attached to the nut and connects the internal thread grooves to each other, wherein
the piece member includes a piece body in which a return groove connecting the internal thread grooves is formed and a pair of engaging portions which are provided on the piece body, extend in opposite directions in a circumferential direction of the nut, and engage with the internal thread groove of the nut,
a joint portion between the piece body and the engaging portion has a fillet shape, and
at least one of the piece body and the engaging portion has a relief portion recessed in a direction away from the nut and the fillet-shaped portion is formed in the relief portion.

2. The piece type ball screw according to claim 1, wherein the engaging portion is formed with a first protruding portion protruding in a direction orthogonal to the circumferential direction of the nut.

3. The piece type ball screw according to claim 2, wherein the protruding portion is arranged in a space between an outer peripheral surface of the screw shaft and an inner peripheral surface of the nut.

4. The piece type ball screw according to claim 2, wherein in the piece member, in a radial plan view of the nut, an R-shaped notch is provided in the protruding portion formed in a V-shaped joint portion in which the engaging portion and the piece body are joined so as to intersect longitudinal directions.

5. The piece type ball screw according to claim 1, wherein a second protruding portion is formed in at least a part of an outer region of an entrance/exit port of a ball passage of the return groove in the piece body so as to protrude in the direction orthogonal to the circumferential direction of the nut.

* * * * *